(12) United States Patent
Anderson et al.

(10) Patent No.: US 9,891,245 B2
(45) Date of Patent: Feb. 13, 2018

(54) REAL-TIME ACCELEROMETER CALIBRATION

(71) Applicant: CloudNav Inc., San Jose, CA (US)

(72) Inventors: Erik Anderson, San Bruno, CA (US); Nathan Royer, San Jose, CA (US)

(73) Assignee: CloudNav Inc., San Jose, CA (US)

( * ) Notice: Subject to any disclaimer, the term of this patent is extended or adjusted under 35 U.S.C. 154(b) by 281 days.

(21) Appl. No.: 14/754,280

(22) Filed: Jun. 29, 2015

(65) Prior Publication Data

US 2016/0377650 A1    Dec. 29, 2016

(51) Int. Cl.
  *G01P 21/00*    (2006.01)
(52) U.S. Cl.
  CPC ..................... *G01P 21/00* (2013.01)
(58) Field of Classification Search
  CPC ....................................................... G01P 21/00
  USPC ........................................................... 702/104
  See application file for complete search history.

(56) References Cited

U.S. PATENT DOCUMENTS

| 8,862,422 | B2 * | 10/2014 | Ikkink | ................. | G01P 15/0891 |
| | | | | | 702/104 |
| 2005/0174324 | A1 | 8/2005 | Liberty et al. | | |
| 2009/0281756 | A1 | 11/2009 | Weed et al. | | |
| 2012/0203486 | A1 | 8/2012 | Almalki et al. | | |
| 2013/0120147 | A1 | 5/2013 | Narasimhan et al. | | |
| 2014/0278191 | A1 * | 9/2014 | Anderson | ............... | G01P 21/00 |
| | | | | | 702/104 |

OTHER PUBLICATIONS

PCT International Search Report and Written Opinion, PCT Application No. PCT/US16/39507, dated Sep. 23, 2016, 15 pages.

* cited by examiner

*Primary Examiner* — Harry W Byrne
(74) *Attorney, Agent, or Firm* — Perkins Coie LLP

(57) ABSTRACT

An electronic device configured for real-time calibration of an on-board accelerometer. A plurality of acceleration measurements are collected from the accelerometer to form a data set. An accelerometer error correction model is maintained that includes bias error calibration parameters, sensitivity calibration parameters, and cross-axis calibration parameters that each specify respective weights for each of bias error, sensitivity error, and cross-axis error. Calibration values are determined for one or more of the bias error calibration parameters, the sensitivity calibration parameters, and the cross-axis error calibration parameters for the data set of acceleration measurements using the accelerometer error correction model. A true acceleration vector may be determined that corresponds to a subsequently received acceleration measurement using the determined calibration values.

8 Claims, 10 Drawing Sheets

REAL-TIME ACCELEROMETER CALIBRATION

BACKGROUND

Field of Disclosure

The described embodiments relate to real-time calibration of accelerometers.

Description of the Related Art

An accelerometer measures the vector sum of forces from gravity and linear acceleration, and in the absence of linear acceleration, the accelerometer measures gravity alone. Since all accelerometers include sources of error (e.g., bias offset, sensitivity errors, cross-axis errors and sensor noise errors), the measurements do not exactly match the vector sum of gravity and linear acceleration. This means that even in the absence of linear acceleration, the estimate of the gravity vector likely includes errors directly caused by the sources of error in acceleration measurement.

To account for the sources of errors, accelerometers are typically calibrated during manufacturing. The calibration generally consists of manipulating the accelerometer (or a finished device including the accelerometer) with high precision to known truth reference orientations. However, maneuvering the accelerometer to known truth orientations adds both time and complexity to testing of devices, and accordingly increases the manufacturing cost. In some cases, manufacturers may simply opt to skip accelerometer calibration altogether. Moreover, even if factory calibration occurs for an accelerometer, that calibration is only accurate for a limited duration of time. For example, mechanical stresses, accelerometer age, and temperature can all affect an accelerometer's calibration and thus the accuracy of its measurements, and are not effectively accounted for by an initial factory calibration.

SUMMARY

An electronic device performs real-time calibration of an on-board accelerometer. A plurality of acceleration measurements are collected from the accelerometer to form a data set. An accelerometer error correction model includes calibration parameters that specify weights in the form of calibration parameters for one or more of bias error, sensitivity error, and the cross-axis error in the presence of a gravitational field. The error correction model and the acceleration measurements in the data set are used to determine calibration values for bias error calibration parameters, sensitivity calibration parameters, cross-axis error calibration parameters, or some combination thereof. For example, calibration values for the bias error calibration parameters may be determined, but not sensitivity calibration parameters or cross-axis error calibration parameters. The electronic device uses the calibration values to, for example, calibrate acceleration measurements output from the accelerometer. Additionally, the electronic device may determine a calibration quality metric that quantitatively measures a quality of the calibration, and determine a true acceleration vector that corresponds to a subsequently received acceleration measurement using the determined calibration values and the error correction model. In some embodiments, the electronic device provides the calibration quality metric to one or more third party applications or devices along with one or more of the calibration values.

Over time certain conditions may cause the accelerometer to lose calibration. For example, mechanical stresses on a device package of the accelerometer, may cause the accelerometer to lose calibration and thus output inaccurate measurements. The electronic device monitors one or more recalibration conditions; if the recalibration conditions are met the electronic device recalibrates the accelerometer by updating the accelerometer error correction model. In this manner, the electronic device corrects for changes that would otherwise cause the accelerometer to fall out of calibration over time.

One embodiment of a method for real-time accelerometer calibration on an electronic device, comprises collecting a plurality of acceleration measurements from an accelerometer to populate a data set, each acceleration measurement representing an estimated acceleration vector, wherein each acceleration vector includes an error component that offsets the estimated acceleration vector from a true acceleration vector due to a combination of a bias error, a sensitivity error, and a cross-axis error. The electronic device maintains an accelerometer error correction model that includes bias error calibration parameters that specify weights for the bias error of the estimated acceleration vector components. The electronic device determines calibration values for the bias error calibration parameters using the accelerometer error correction model and the plurality of acceleration measurements. The electronic device determines a calibration corrected estimated of a true acceleration vector that corresponds to a subsequently received acceleration measurement using the determined calibration values and the error correction model.

Another embodiment of the method for real-time accelerometer calibration on an electronic device, comprises collecting a plurality of acceleration measurements from an accelerometer to populate a data set, each acceleration measurement representing an estimated acceleration vector, wherein each acceleration vector includes an error component that offsets the estimated acceleration vector from a true acceleration vector due to a combination of a bias error, a sensitivity error, and a cross-axis error. The electronic device maintains an accelerometer error correction model that includes at least one set of calibration parameters selected from a group consisting of: bias error calibration parameters, sensitivity calibration parameters, and cross-axis calibration parameters that each specify respective weights for each of the bias error, the sensitivity error, and the cross-axis error of the estimated acceleration vector components. The electronic device determines calibration values for the at least one set of error calibration parameters determining values for the bias error calibration parameters using the accelerometer error correction model and the plurality of acceleration measurements. The electronic device provides a calibration quality metric that is based in part on the calibration values and one or more of the calibration values to a third party application operating on the electronic device.

DETAILED DESCRIPTION

Figure 1A:
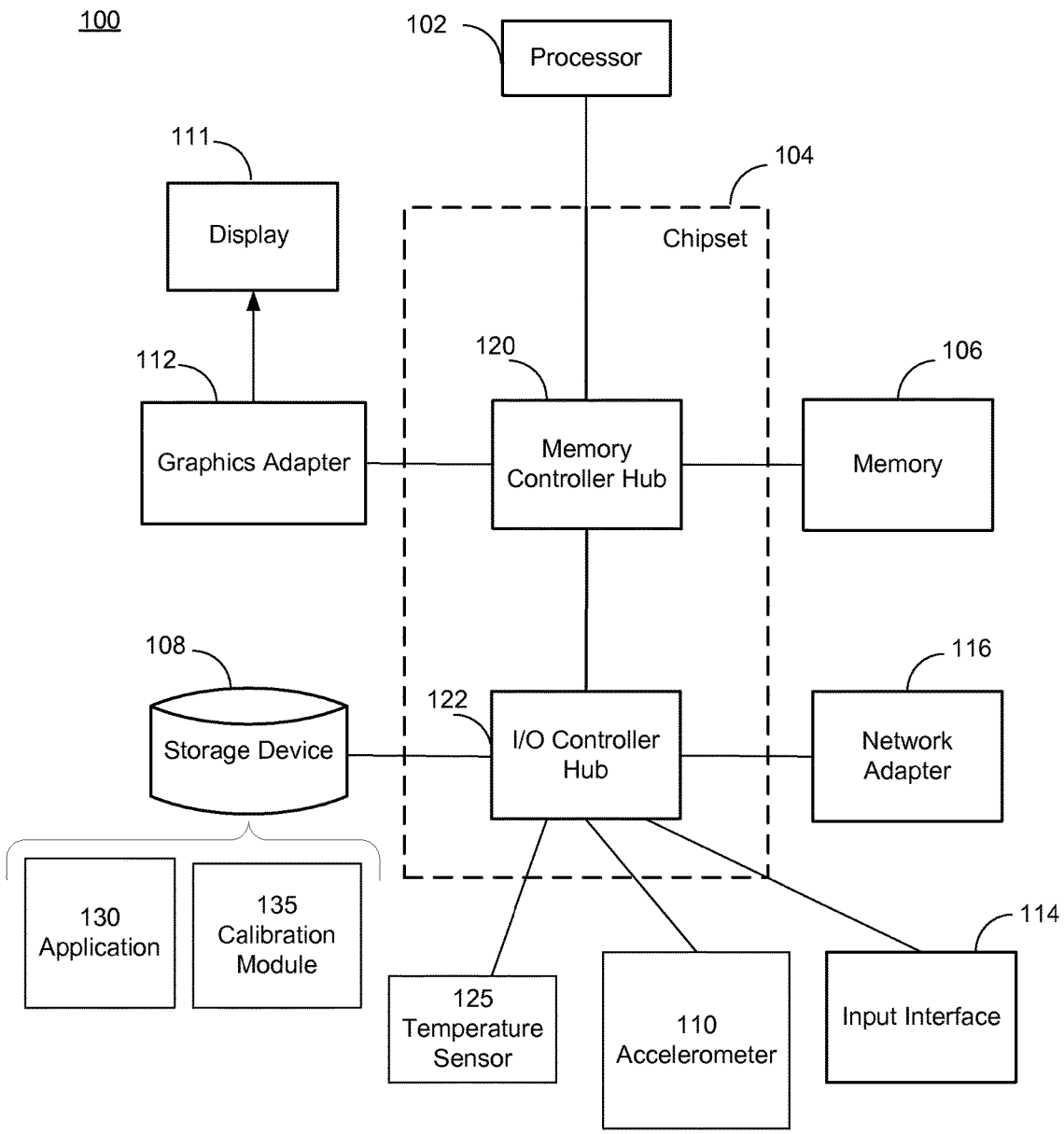
FIG. 1A is a block diagram illustrating an electronic device that is configured for real-time accelerometer calibration, according to an embodiment.

A calibration method for real-time calibration of an accelerometer on board an electronic device is described herein. The calibration method does not require comparing measurements against known truth reference orientations (e.g., specific positions) as is typical in a factory calibration. Instead the method calibrates the accelerometer in real-time, and calibration may occur during normal operation and use as well as at the factory.

An electronic device performing the calibration method collects a plurality of acceleration measurements from an accelerometer to populate a data set. The data set is populated in a manner to ensure that both (1) a minimum separation in angle (e.g., between 5 and 10 degrees) between each acceleration measurement in the data set, and (2) each acceleration measurement has a linear acceleration component that maintained below a threshold value for at least a threshold period of time. Each acceleration measurement represents an estimated acceleration vector, and each estimated acceleration vector includes error components that cause the measured estimated acceleration vector to differ from the true acceleration vector.

The electronic device uses an accelerometer error correction model (also referred to as an "error correction model") to calibrate acceleration measurements. The error correction model specifies a weight for one or more of various error sources (e.g., bias error, sensitivity error, and cross-axis error) in the presence of a gravitational field. Using the error correction model and acceleration measurements in the data set, the electronic device identifies values for calibration parameters that characterize the error sources.

In some embodiments, the electronic device determines a calibration quality metric using the calibration values and the acceleration measurements in the data set, and provides the calibration quality metric, one or more of the calibration values, or some combination thereof, to one or more third party applications (e.g., a fitness application operating on the electronic device). In alternate embodiments, the electronic device updates a register on the accelerometer with values of the calibration parameters, and the accelerometer updates an on-board version of the error correction model such that the accelerometer calibrates subsequent acceleration measurements to account for the error sources. For subsequently received acceleration measurements, the electronic device determines corresponding true acceleration vectors using the determined values for the bias error calibration parameters, the sensitivity calibration parameters, and the cross-axis error calibration parameters. The calibration method monitors one or more recalibration conditions, that if met, cause the electronic device to recalibrate the accelerometer. Thus, real-time calibration of the accelerometer during normal operation can achieve higher long term accuracy than, for example, very precise—and potentially expensive—one-time factory calibrations. Further, because the calibration method uses data that is captured in real time, the calibration method is able to account for conditions (e.g., age of the device, swings in temperature, etc.) that over time would normally cause the accelerometer to lose calibration.

The Figures and the following description describe certain embodiments of the calibration method and electronic device configured to perform the method, by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

FIG. 1A is a block diagram illustrating an electronic device 100 that is configured for real-time accelerometer calibration, according to an embodiment. The electronic device 100 is a computing device that executes computer program modules which are stored on a non-transitory computer-readable medium and in turn use acceleration data provided by an accelerometer 110. The electronic device 100 may be, for example, a smartphone, a tablet computer, laptop computer, game controller, a fitness device, navigation device, or included in a larger machine such as an aircraft, a remotely operated vehicle, an autonomous vehicle, or any type of electronic device or machine that uses data from an onboard accelerometer 110.

The electronic device 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 111 is coupled to the graphics adapter 112. A storage device 108, an input interface 114, the accelerometer 110, and a network adapter 116 are coupled to the I/O controller hub 122. Other embodiments of the electronic device 100 have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The input interface 114 is a touch-screen interface, a mouse, track ball, or other type of pointing device, a keyboard, or some combination thereof, and is used to input data into the electronic device 100. In some embodiments, the electronic device 100 may be configured to receive input (e.g., commands) from the input interface 114 via gestures from the user. The graphics adapter 112 displays images and other information on the display 111. The network adapter 116 couples the electronic device 100 to one or more computer networks. Additionally, the electronic device 100 may include one or more temperature sensors 125. The one or more temperature sensors 125 monitor the temperature of the accelerometer 110 and/or other components of the electronic device 100. The temperature sensors 125 may be, e.g., a thermocouple or some other sensor that measures temperature. In some embodiments, the electronic device 100 can lack some of the components described above, such display 111, graphics adapter 112, and temperature sensor 125, and network adapter 116.

The electronic device 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The electronic device 100 further comprises an application 130 and a calibration module 135; the electronic device 100 may have different modules than those described here. Similarly, the functions can be distributed among the modules in a different manner than is described here. For example, the calibration module 135 may be part of the accelerometer 110 and/or the application 130.

The application 130 is any module that uses calibrated acceleration measurements to perform an action, and may be provided by a third party. The application 130 may be, for example, a program that uses the calibrated acceleration measurements to track movement of the electronic device 100, a program that uses the calibrated acceleration measurements to track an orientation (e.g., landscape, portrait, etc.) of the electronic device 100, a navigation program that uses the acceleration measurements for dead reckoning, and some other software and/or hardware that uses the calibrated acceleration measurements. The application 130 may include the error correction model, or some other relation that uses the calibration values, to calibrate acceleration measurements such that they account for the error sources. The calibration relation uses one or more calibration values provided by the calibration module 135 in order to output calibrated acceleration measurements.

The accelerometer 110 measures acceleration forces, and outputs signals (e.g., voltage signal) that correspond to the measured acceleration forces as acceleration measurements. The accelerometer 110 may include one or more single axis accelerometers, dual axis accelerometers, three axis accelerometers, or some combination thereof. For example the accelerometer 110 may be a three axis accelerometer that measures acceleration in three dimensions (x, y, and z). The accelerometer 110 may include accelerometers of one or more types (e.g., surface or bulk micromachined capacitive (MEMS), piezoelectric, thermal, strain gauge, etc.).

The accelerometer 110 outputs a signal that corresponds to a measured acceleration force as an acceleration measurement. The acceleration measurement quantifies an estimated acceleration vector of the electronic device 100. The acceleration measurement includes an x-component of an estimated acceleration vector, a y-component of the estimated acceleration vector, and a z-component of the estimated acceleration vector in an x-y-z coordinate system. In other embodiments, the estimated acceleration vector may be described by other coordinate systems (e.g., spherical). The acceleration measurements are preferably in units of g's (e.g., 1 g=9.81 m/s$^2$).

Figure 1B:
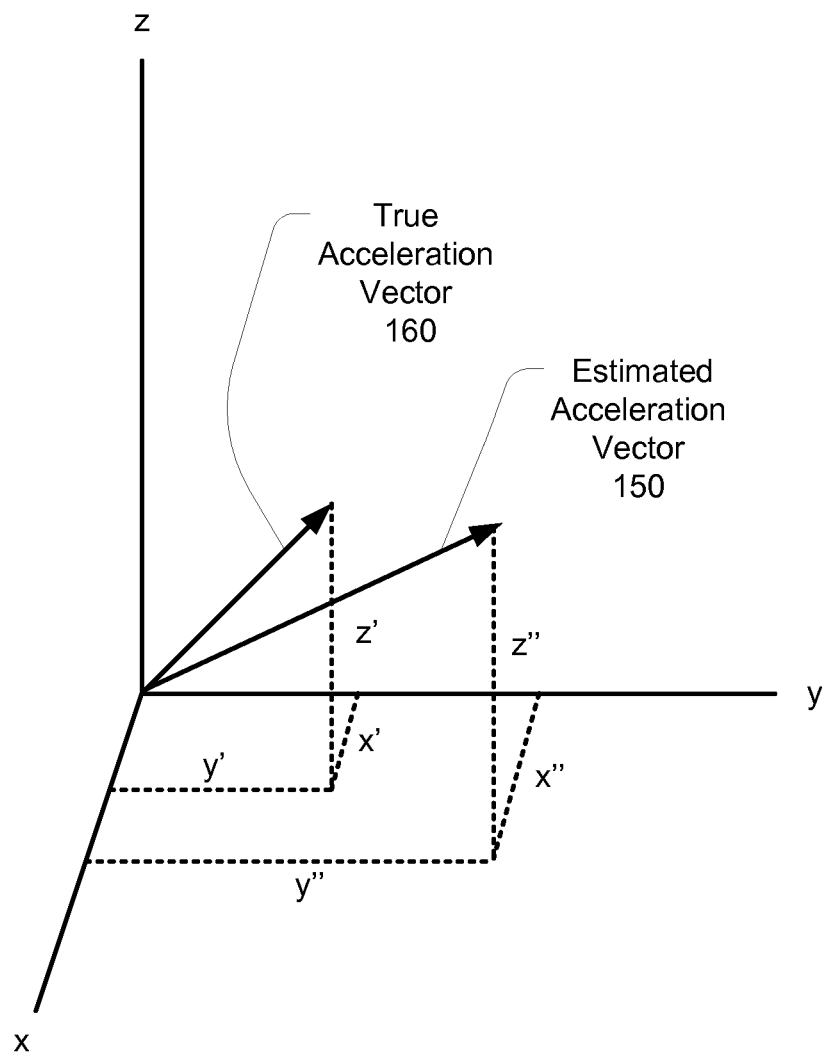
FIG. 1B is a plot of an estimated acceleration vector and its corresponding true acceleration vector, according to an embodiment.

The estimated acceleration vector is comprised of a gravitational component, a linear acceleration component, an error component, or some combination thereof. The gravitational component is representative of the Earth's gravitational force on the accelerometer 110. The linear acceleration component is representative of a force on the accelerometer 110 other than the Earth's gravitational force. For example, in an ideal case (i.e., no error component) an accelerating accelerometer 110 would have a linear acceleration component in the direction matching the non-gravitational force applied and a gravitational component in the direction of the Earth's gravity. The combination of the linear acceleration component and the gravitational component is a true acceleration vector. The error component offsets the estimated acceleration vector from the true acceleration vector due to one or more error sources. For example, FIG. 1B is a plot of an estimated acceleration vector 150 and its corresponding true acceleration vector 160, according to an embodiment. The estimated acceleration vector 150 includes an x" component, a y" component, and a z" component, and the true acceleration vector 160 includes an x' component, a y' component, and a z' component. The offset between the vectors 150 and 160 is caused by one or more error sources. Turning back to FIG. 1A, an error source may be, for example, a bias error, a sensitivity error, a cross-axis error, or some combination thereof resulting from operational, environmental, or systematic features of the device 100 and its components. The accelerometer 110 provides the acceleration measurements to the calibration module 135.

The calibration module 135 collects acceleration measurements from the accelerometer 110. As discussed below in detail with regard to FIGS. 3 and 5, the calibration module 135 populates a data set in memory 106 with the collected acceleration measurements (i.e., estimated acceleration vectors). The calibration module 135 generates an error correction model to model the relationship between error sources, estimated acceleration vectors, and true acceleration vectors; the error correction model is also stored in memory 106. The generated error correction model includes calibration parameters that describe bias error, sensitivity error, cross-axis error, or some combination thereof. The calibration parameters are weights used by the model and figure of merit to describe the effects of error sources on true acceleration vectors. The calibration parameters are later described in detail below for each of the error sources.

The calibration module 135 uses the error correction model, acceleration measurements in the data set, and Earth's gravity to determine calibration values for each of the calibration parameters. As discussed in detail below with regard to FIGS. 3 and 4, the calibration module 135 perturbs, in a progressive and iterative manner, the calibration parameters to generate various estimated acceleration measurements, and using a modified variance of the estimated acceleration matrices determines values for each of the calibration parameters that result in corresponding minimum values of the modified variance. In some embodiments, once values of calibration parameters have been determined to a particular precision (e.g., bit resolution or threshold delta value), the calibration module 135 calculates a calibration quality metric that quantifies a quality of calibration that may be achieved by using the determined calibration values to correct for error in acceleration measurements output by the accelerometer 110. In some embodiments, the calibration module 135 provides the calibration quality metric, one or more of the calibration values, or some combination thereof, to the application 130. In alternate embodiments, the calibration module 135 updates a register on the accelerometer 110 with values of the calibration parameters, and the accelerometer 110 updates an on-board version of the error correction model such that the accelerometer 110 calibrates subsequent acceleration measurements to account for the error sources. The calibration module 135 then provides the calibrated acceleration measurements via, e.g., an application peripheral interface, to the Application 130.

Bias error is the output of the accelerometer when the accelerometer 110 is not experiencing any linear or gravitational force. For example, assuming the accelerometer 110 is on Earth and is not accelerating the true acceleration vector should be the gravitational component. However, if bias error is present, the accelerometer 110 would output acceleration measurements that represent an estimated acceleration vector that is offset from the true acceleration vector. Bias error may be described using a bias error calibration parameter for each of the x, y, and z, axis, ($B_x$, $B_y$, $B_z$), that collectively are referred to as bias error calibration parameters. Specific examples of bias error are discussed below at FIGS. 2A and 2B.

Sensitivity error is associated with deviations from a specified a sensitivity for an accelerometer 110. Sensitivity is a ratio in the change in acceleration force (input) to a change in the estimated acceleration vector (output), and is sometimes referred to as a "scale factor" of an accelerometer. Ideally, the scale factor equals 1 for the x, y, and z axis, and is typically specified as being within a specific tolerance of the scale factor (e.g., scale factor ±0.02 for each axis) for a set of operating conditions specified by the manufacturer. The operating conditions may be, for example, a particular temperature range (e.g., 25° C.±5° C.), a particular acceleration amplitude (4 g, 8 g, etc.), a particular sampling frequency (e.g., 100 Hz), some other condition that if varied affects the scale factor, or some combination thereof. If the electronic device 100 operates outside of the specified operating conditions, the scale factor may drift to different values outside the specified tolerance. The deviation from the ideal value of scale factor to some other value is the sensitivity error, and is described using sensitivity calibration parameters for the x-axis ($S_x$), for the y-axis ($S_y$), and for the z-axis ($S_z$), that collectively are referred to as sensitivity calibration parameters, ($S_x$, $S_y$, $S_z$). In the ideal case the sensitivity calibration parameters are (1, 1, 1), however, sensitivity error may be present for one or more axes. For example a sensitivity error of 10% along the x-axis, no error (ideal sensitivity) along y-axis and z-axis may be represented by (1.1, 1, 1). Specific examples of sensitivity error are discussed below at FIGS. 2C and 2D.

Cross-axis error is a measure of how much output is seen on one axis when acceleration is imposed on a different axis. Cross-axis error may be caused by, e.g., fabrication error in beam positioning of a MEMS accelerometer 110 or the accelerometer 110 being out of alignment with the electronic device 100 it is mounted to. Given a true acceleration along a specific axis (e.g., x-axis) cross-axis error causes the estimated acceleration vector to include acceleration along some other axis (e.g., y-axis or z-axis) in addition to the x-axis. Cross-axis error may be described using a cross-axis error calibration parameter for x to y axis ($C_{x-y}$), x to z axis ($C_{x-z}$), y to x axis ($C_{y-x}$), y to z axis ($C_{y-z}$), z to x axis ($C_{z-x}$), and z to y axis ($C_{z-y}$), that collectively are referred to as cross-axis error calibration parameters, ($C_{x-y}$, $C_{x-z}$, $C_{y-x}$, $C_{y-z}$, $C_{z-x}$, and $C_{z-y}$). Specific examples of cross-axis error are discussed below at FIG. 2E. Of the three error sources described herein, bias error tends to be the largest, sensitivity error is typically but not always a smaller angle error contributor than bias error, and cross-axis error is typically but not always provides the smallest contribution to angle error.

Over time certain conditions may cause the accelerometer 110 error parameters to change, causing previously measured calibration parameters to become less accurate. For example, mechanical stresses on a device package of the accelerometer 110, aging of the accelerometer 110, and temperature changes, all may cause the accelerometer 110 calibration to degrade. The calibration module 135 monitors one or more recalibration conditions that if met, cause the calibration module 135 to recalibrate the accelerometer 110. In this manner, the calibration module 135 corrects for changes that would otherwise cause the accelerometer 110 to fall out of calibration over time. For example, the calibration module 135 monitors the output of the temperature sensor, and if the temperature deviates more than a threshold value from a temperature at which the previous calibration as performed (i.e., meets a recalibration condition), the calibration module 135 re-calibrates the accelerometer 110. Accordingly, real-time calibration of the accelerometer during normal operation can achieve higher long term accuracy than factory calibration since the calibration parameters can be updated in real-time when needed.

FIGS. 2A-2F illustrate the types of error sources that may be present in an acceleration measurement. The curves represented in FIGS. 2A-2F are not used by the electronic device 100 to calibrate the accelerometer, and are included merely to help explain the different forms of error.

Figure 2A:
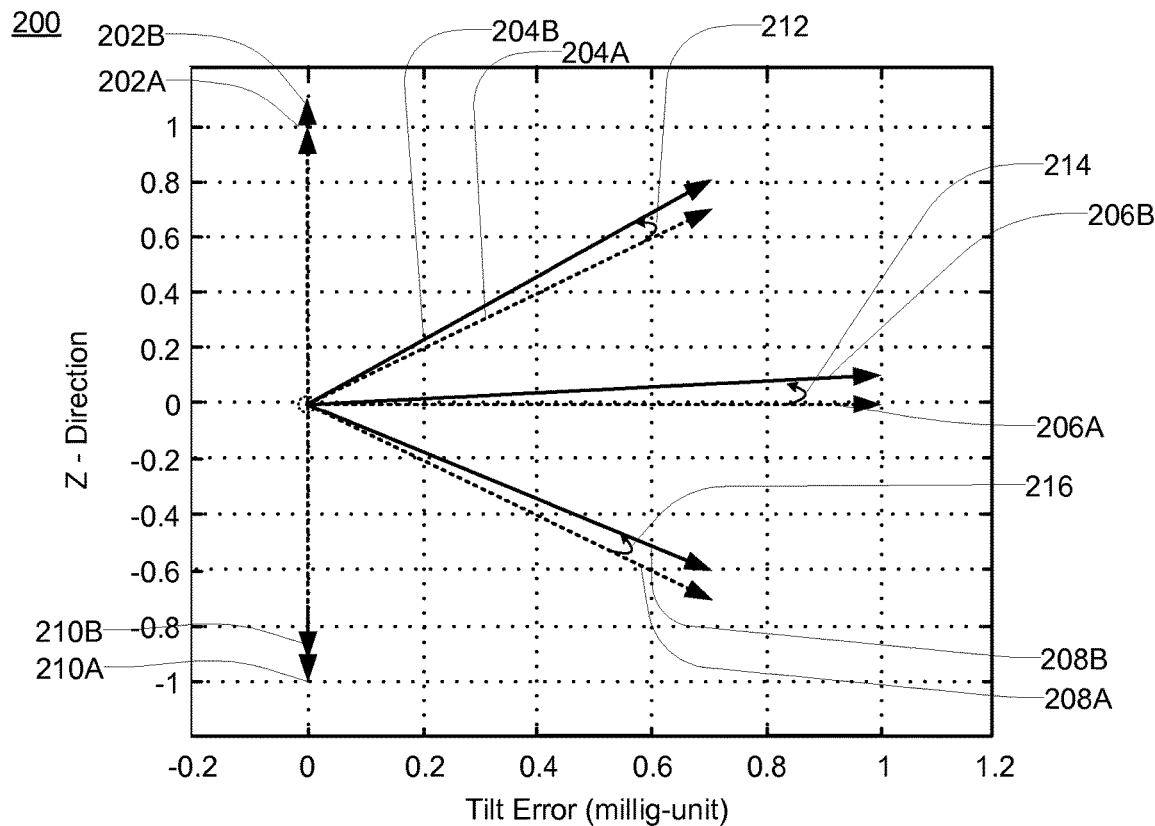
FIG. 2A is an example plot of orientation dependent tilt angle errors due to bias error.

FIG. 2A is an example plot 200 of orientation dependent tilt angle errors due to bias error. The plot 200 is based on a 100 millig bias error on the z-axis, and for simplicity, does not show bias error on the x-axis and y-axis. In practice, bias error may also occur along the x-axis and the y-axis. The plot 200 shows true acceleration vectors 202A, 204A, 206A, 208A, and 210A that represent true acceleration in an ideal case where all error sources are zero. Additionally, the plot 200 shows the measured acceleration vectors when a 100 millig bias is present as 202B, 204B, 206B, 208B, and 210B. In FIG. 2A, an estimated acceleration vector is the true acceleration vector offset by bias error. Notice that when the acceleration vectors are parallel to the z-axis, e.g., accelerating straight up (e.g., vectors 202A, 202B) or straight down (e.g., vectors 210A, 210B) the tilt angle error is zero. Where the actual and estimated acceleration vectors deviate from the z-axis there is error in tilt angle that manifests as offset between the actual and estimated acceleration vectors, specifically offset 212 between vectors 204A and 204B, offset 214 between vectors 206A and 206B, and offset 216 between vectors 208A and 208B.

Figure 2B:
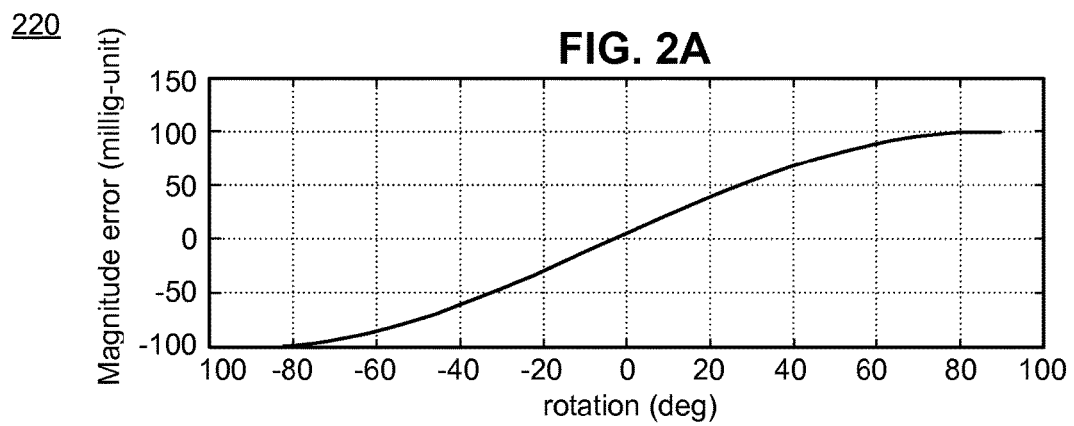
FIG. 2B are example plots of magnitude of bias error (top trace) and error in tilt angle estimate (bottom trace), based on a 100 millig bias error on the z-axis.
Figure 2B:
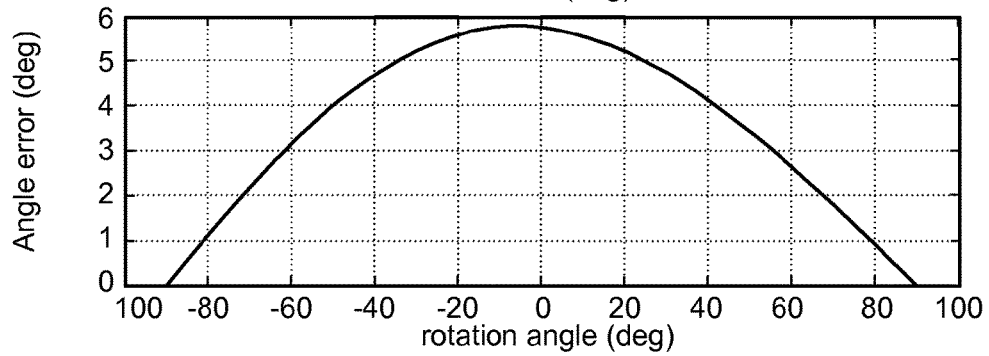

FIG. 2B are example plots 220 of magnitude of bias error (top trace) and error in tilt angle estimate (bottom trace), based on a 100 millig bias error on the z-axis. With reference to FIG. 2A, the vector at 206A is at zero degrees rotation, and the vector 202A is at 90 degrees rotation. The difference in magnitude of vectors 206A and 206 B is close to zero— which matches the magnitude of bias error for 0 degrees rotation in the top trace. Similarly, it is apparent from FIG. 2A that there is an angular offset 214 between vectors 206A and 206B, from the bottom trace shows for zero degrees rotation value of ~5.8 degrees—which is the angle of the offset 214.

Figure 2C:
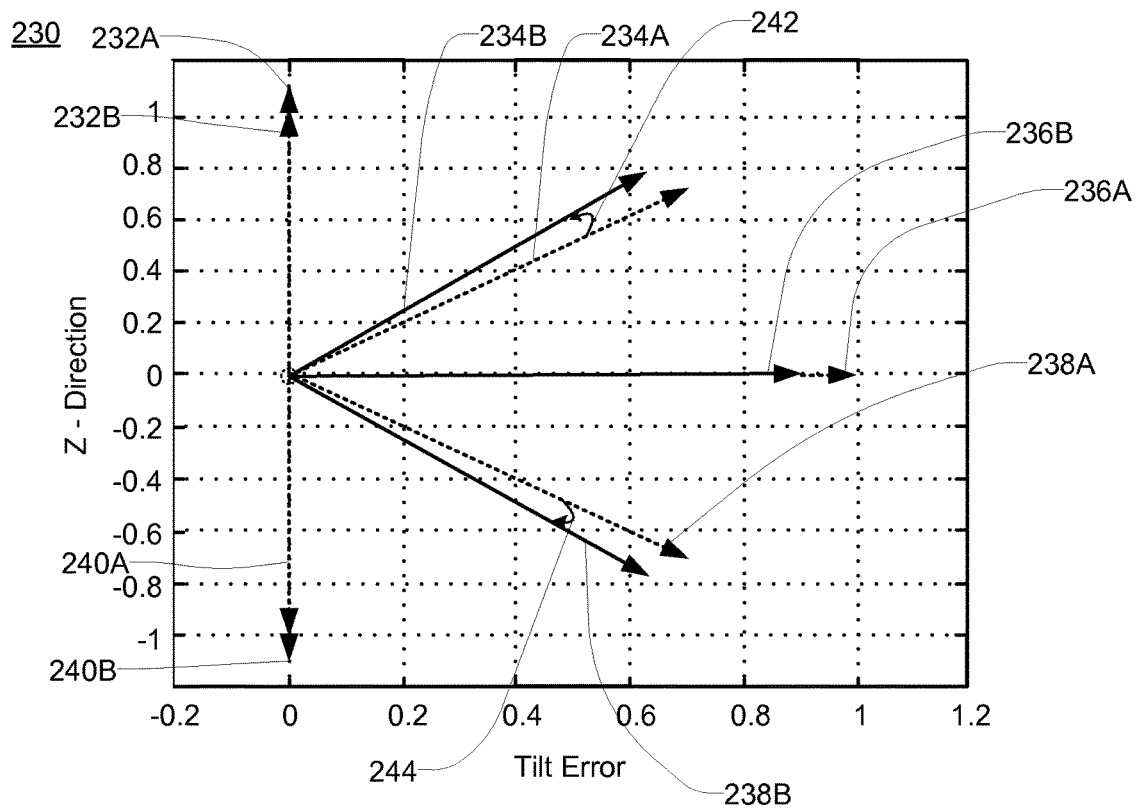
FIG. 2C is an example plot of orientation dependent tilt angle errors due to sensitivity error, based on a z-axis sensitivity of 1.1 (10% high) and an x-axis sensitivity of 0.9 (10% low).

FIG. 2C is an example plot 230 of orientation dependent tilt angle errors due to sensitivity error. The plot 230 is based on a sensitivity error on the z-axis where sensitivity is 1.1 times an ideal sensitivity (i.e., 1), and where sensitivity on the x-axis is 0.9 times an ideal sensitivity (i.e., 1). In practice, sensitivity error may also occur along any and all axes. The plot 230 shows true acceleration vectors 232A, 234A, 236A, 238A, and 240A. The true acceleration vector is an ideal case where all error sources are zero. Additionally, the plot 230 shows estimated acceleration vectors 232B, 234B, 236B, 238B, and 240B. In FIG. 2C, an estimated acceleration vector is the true acceleration vector scaled by a non-unity sensitivity value. Like in FIG. 2A, when accelerating along the z-axis (e.g., vectors 232A and 232B, and vectors 230A and 230B) the tilt angle error is zero—basically cases where the vectors align with or against the Earth's gravity, however, for cases where the actual and estimated acceleration vectors deviate from the z-axis there is error in tilt angle that manifests as an offset between the actual and estimated acceleration vectors. Where the actual and estimated acceleration vectors deviate from the z-axis there is error in tilt angle that manifests as offset between the actual and estimated acceleration vectors, specifically offset 242 between vectors 234A and 234B, and offset 244 between vectors 238A and 238B.

Figure 2D:
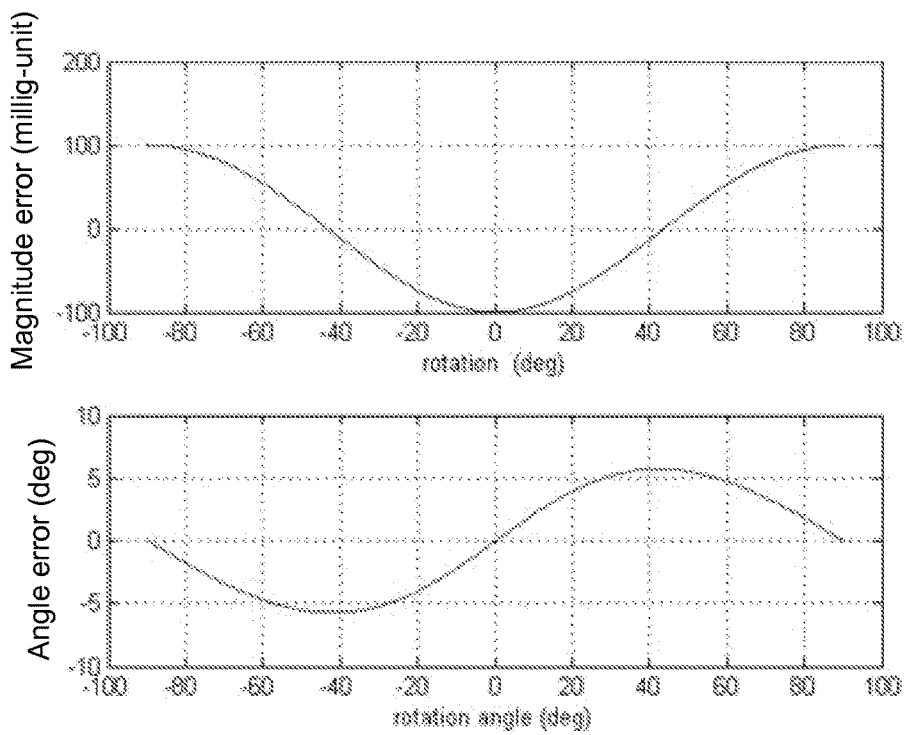
FIG. 2D are example plots of magnitude of acceleration error (top) and error in tilt angle estimate (bottom), based on a sensitivity error of +0.1 on the z-axis and −0.1 in the x-axis.

FIG. 2D are example plots 250 of magnitude of acceleration error (top) and error in tilt angle estimate (bottom), based on a sensitivity error of +0.1 on the z-axis and –0.1 on the x-axis. With reference to FIG. 2C, the vector at 236A is at zero degrees rotation, and the vector 232A is at 90 degrees rotation Similarly, it is apparent from FIG. 2C that there is zero angular offset between vectors 236A and 236B, this matches the zero angular offset shown in the bottom trace for a rotation angle of zero degrees.

Figure 2E:
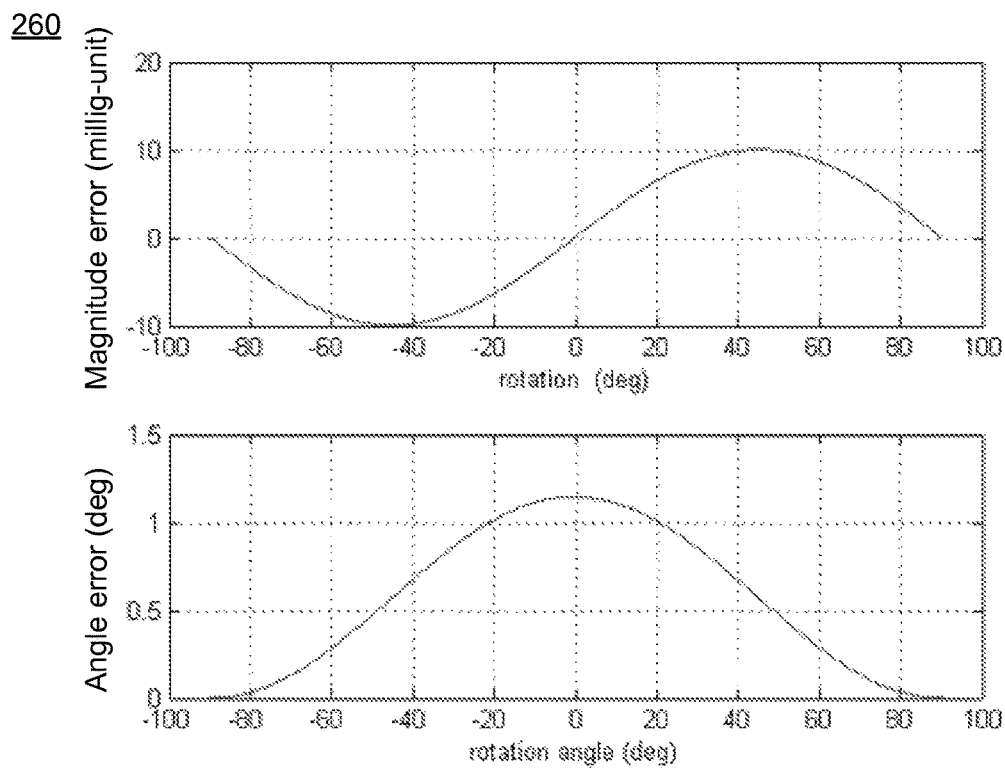
FIG. 2E are example plots of magnitude of bias error (top trace) and error in tilt angle estimate (bottom trace), based on an x axis to z axis cross-axis error of 2%.

Cross-axis error is generally much lower than bias error and sensitivity error, however, for completeness, FIG. 2E are example plots 260 of magnitude of bias error (top trace) and error in tilt angle estimate (bottom trace), based on an x-axis to z-axis cross-axis error of 2%. For simplicity FIG. 2E, does not illustrate cross-axis error on, e.g., the x-axis to the y-axis, the z-axis to the axis, etc., which in practice may be present. In the ideal case, cross-axis error would be zero. However, for the data presented in plot 260 there is cross-axis error present, however, it is small relative to the bias error and sensitivity error presented above in FIGS. 2A-2D. For example, in plot 260 the error in magnitude is between AO millig, and the error is always less than ~1.3 degrees. In contrast, plot 220 indicates that for bias error, the error in magnitude is between ±100 millig, and the error is always less than ~5.8 degrees, and plot 250 indicates that for sensitivity error, the error in magnitude is between ±100 millig, and the error ranges between ±5.2 degrees.

Figure 2F:
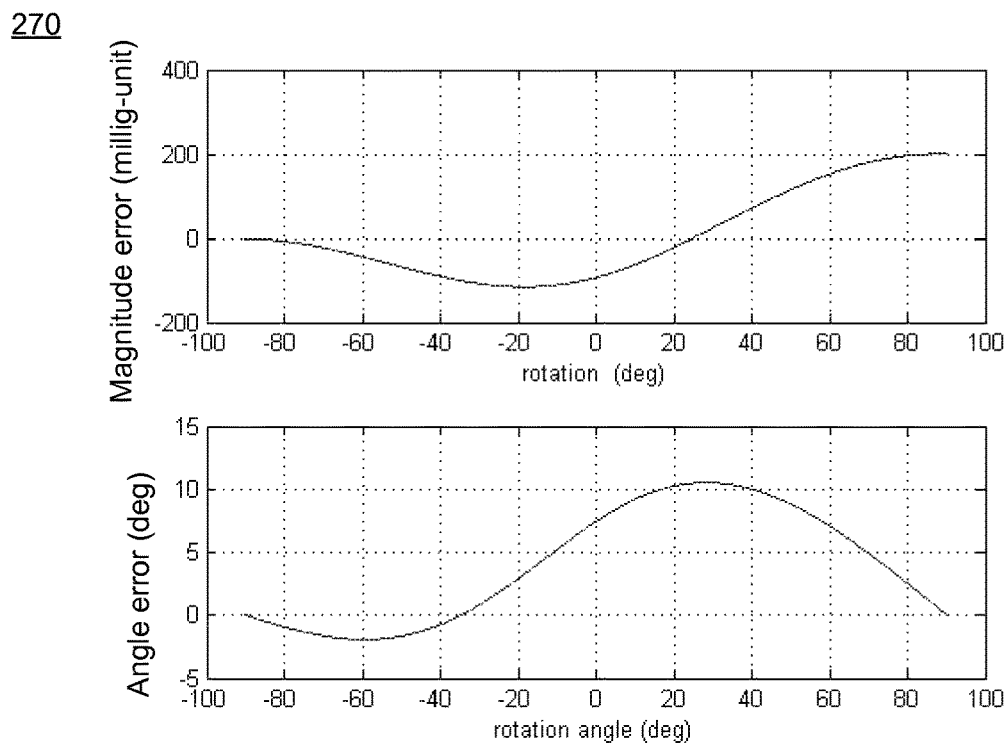
FIG. 2F are example plots of magnitude of bias error (top trace) and error in tilt angle estimate (bottom trace), for acceleration measurements affected by the bias error, the sensitivity error, and the cross-axis error of FIGS. 2A-2E.

While FIGS. 2A-2E show individual errors, it is useful to see how these errors combine. FIG. 2F are example plots 270 of magnitude of bias error (top trace) and error in tilt angle estimate (bottom trace), for acceleration measurements affected by the bias error, the sensitivity error, and the cross-axis error of FIGS. 2A-2E. Note that the bias error of up to 100 millig, a sensitivity error of +/–10%, and a cross-axis error of 2% are typical of many modern consumer grade accelerometers. FIG. 2F clearly shows that these error sources can results in rather large errors, specifically, a maximum error in magnitude of ~200 millig at a 90 degree rotation angle, a maximum error in angle of ~11 degrees at a rotation angle of ~28 degrees.

Figure 3:
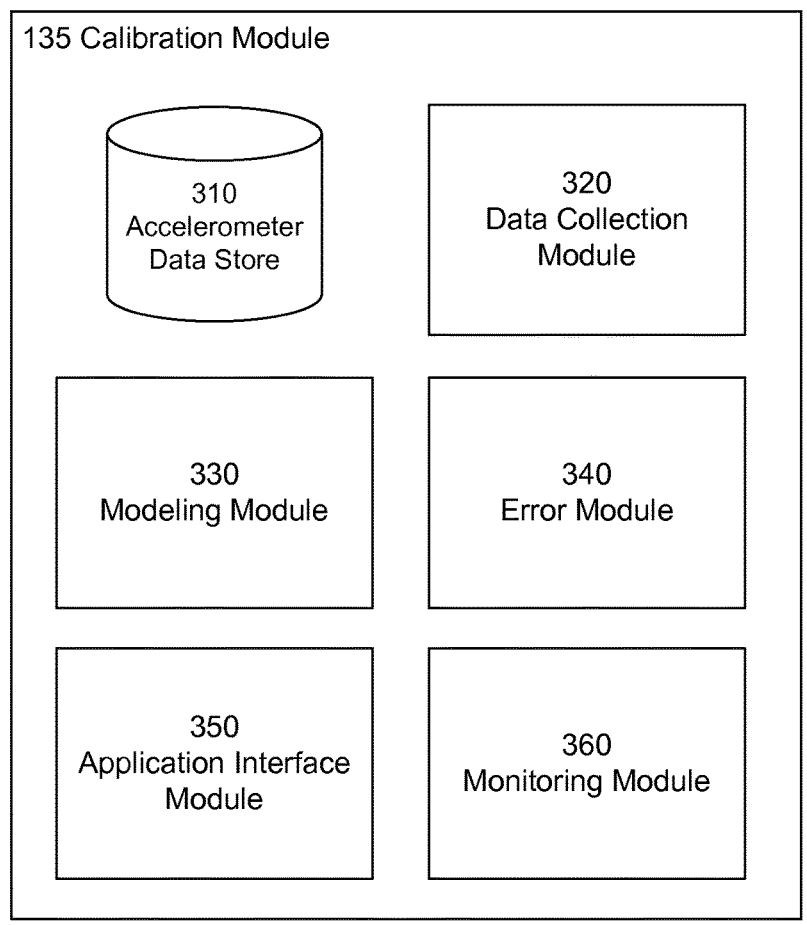
FIG. 3 is a block diagram illustrating a detailed view of modules within a calibration module according to one embodiment.

Turning now to a discussion of the structure of the calibration module 135, FIG. 3 is a block diagram illustrating a detailed view of modules within the calibration module 135 according to one embodiment. Some embodiments of the calibration module 135 have different modules than those described here. Similarly, the functions can be distributed among the modules in a different manner than is described here. The calibration module 135 is comprised of modules including an accelerometer data store 410, a data collection module 320, a modeling module 330, an error module 340, an application interface module 350, and a monitoring module 360.

The accelerometer data store 310 stores information relating to the accelerometer 110 and its calibration. Information relating to the accelerometer 110 includes acceleration measurements output from the accelerometer 110, default values for calibration parameters for error sources, calibrated values for error source calibration parameters, one or more temperatures associated with a calibration of the accelerometer 110, or some combination thereof. Acceleration measurements are output from the accelerometer 110. Each acceleration measurement representing an estimated acceleration vector that includes an error component that offsets the estimated acceleration vector from a true acceleration vector. The offset is due to bias error, sensitivity error, cross-axis error, or some combination thereof.

The data collection module 320 collects acceleration measurements from the accelerometer 110 to populate a data set of size N (e.g., 128 samples of acceleration measurements). The data collection module 320 is coupled to receive the acceleration measurements in the x, y, and z axes as they are output from the accelerometer 110. While the data set is not full (i.e., less than N samples have been collected), the data collection module 320 populates the data set in accordance with a plurality of population conditions. The population conditions control whether or not the data collection module 320 adds a received acceleration measurement to the data set. The population conditions include a maximum linear acceleration (e.g., between ±50 millig) within a specified period of time (e.g., 100 ms) and a minimum threshold angle (e.g., 7.5 degrees) between the received acceleration measurement and any of the acceleration measurements already present in the data set. In alternate embodiments, the population conditions may additionally include, some other property of an acceleration measurement, the number of acceleration measurements in the data set, or some combination thereof.

Upon initiation of the calibration process, if the data set is empty, once a new acceleration measurement is received, the data collection module 320 determines whether the population conditions are met. As noted above, one population condition is that (1) a linear acceleration component of the new acceleration measurement is below a maximum linear acceleration, and (2) that the linear acceleration component has been below the maximum linear acceleration for a specified period of time (e.g., 100 ms). The data collection module 320 compares the linear acceleration component of the new acceleration measurement to the maximum linear acceleration. The data collection module 320 also determines how long the linear acceleration component is within a maximum allowed value (e.g., between ±50 millig) by comparing the linear acceleration component of the new acceleration measurement to linear acceleration components determined from one or more previously received acceleration measurements. If both (1) and (2) are met, this population condition is satisfied.

Another population condition is whether the new acceleration measurement is outside of a minimum threshold angle with the acceleration measurements in the data set. In some embodiments, to determine whether a subsequent acceleration measurement, $AM_{new}$, is outside of a threshold angle with other acceleration measurements in the data set (e.g., $AM_i$), the data collection module 320 determines a set of angles ($\theta_1, \theta_2, \ldots \theta_N$) between $AM_{new}$ and each of the previously stored acceleration measurements $AM_i$, using a relation derived from the dot product of two acceleration measurements:

$$\theta_i = \cos^{-1}\left(\frac{AM_{new} \cdot AM_i}{|AM_{new}||Am_i|}\right) \quad (1)$$

where $AM_i$ is the acceleration measurement in the $i^{th}$ position of the data set, and i is an integer than ranges between 1 and N, and $\theta_i$ is the corresponding angle between $AM_{new}$ and $AM_i$. In this manner, the data collection module 320 uses equation (1) to determine the set of angles between $AM_{new}$ and each of the acceleration measurements in the data set. The data collection module 320 compares the set of angles to the minimum angle threshold, and if each angle in the set of angles is greater than the minimum angle threshold, the population condition is satisfied. The evaluation of each new measurement against all previous measurements is simple, but may not be the most efficient, especially as the data set increases in size. In other embodiments, the data collection module 320 may use other, possibly more efficient, but more complex algorithms to populate the data set. For example, the data collection module 320 may use a binary search algorithm, a nearest neighbor algorithm, or some other algorithm to populate the data set with acceleration measurements that are separated by at least the threshold angle value from adjacent acceleration measurements.

The threshold angle value is chosen such that there is a minimum angle (e.g., a value between 5 and 10 degrees, e.g. 7.5 degrees) between each of the estimated acceleration vectors that are described by their corresponding acceleration measurement. Accordingly, acceleration measurements in the data set have a minimum separation in angle. Conceptually, each estimated acceleration vector points at some point on a surface of an ellipsoid. The data set includes acceleration measurements that are each unique (not a duplicate acceleration measurement) and are separated from other acceleration measurements by the threshold angle value. The corresponding estimated acceleration vectors point to different points across the entire ellipsoid, in a relatively uniform manner. This results in a better calibration that is less susceptible to noise than, for example, cases where the data set only includes acceleration measurements that cover only the same or close to the same portion of the ellipsoid. In practice, a reasonable number of data samples in the data set is 128. Assuming the ellipsoid is a sphere, if directional coverage is uniform over the sphere, with this number of acceleration measurements, each estimated acceleration vector is angled approximately 20 degrees from other adjacent estimated acceleration vectors. If the acceleration measurements collected are such that the sphere is totally uniformly sampled, fewer data points may be used, however, 128 has been found to offer sufficient coverage that makes large coverage gaps unlikely while remaining computationally inexpensive.

In some embodiments, the data collection module 320 may modify one or more of the population conditions. The data collection module 320 may, for example, reduce the maximum linear acceleration, adjust the specified period of time associated with the maximum linear acceleration, adjust the minimum threshold angle, or some combination thereof to reduce computational load, calibration time, or increase or decrease calibration accuracy. The data collection module 320 may adjust one or more of the population conditions responsive to instructions from the error module 340.

Initially populating the data set in accordance with the population conditions facilitates the collected measurement having sufficient coverage over a full range of possible acceleration measurements. Due to the population conditions, it may take, for example, many hundreds of acceleration measurements to occur before the data set is completely filled. For example, it may take approximately 1,000 acceleration measurements to be received, before a data set of size N=128 is completely filled. In order to have sufficient number of measurements to reach a calibration solution the collected data set of acceleration measurements is greater than or equal to the number of unknown calibration parameters. In practice, as real-time calibration of the accelerometer 110 occurs in the field and not at the factory with truth references, the collected set of acceleration measurements is much larger than the number of unknown calibration parameters. The size (i.e., N) of the data set may be, for example, 128, 256, or some other number larger than the total number of calibration parameters.

The data collection module 320 continues to collect acceleration measurements even though the data set is full. As discussed below with regard to FIG. 5, the data collection module 320 identifies any extremum in the data set. An extremum is an acceleration measurement that, once calibrated, has a maximum magnitude (Max) above a maximum threshold value or a minimum magnitude (Min) that is below a minimum threshold value. In cases where an extremum is present in the data set, the data collection module 320 compares a magnitude of a calibrated value of the new acceleration measurement to the magnitude associated with the extremum. If the calculated magnitude is closer to an expected value (e.g., 1 g) than the Max or Min values the data collection module 320 replaces the acceleration measurement associated with the extremum with the new acceleration measurement, otherwise the data collection module 320 discards the new acceleration measurement.

In embodiments, where no extremum is present in the data set, the data collection module 320 identifies the two acceleration measurements that are closest in angle among the acceleration measurements in the data set and the new acceleration measurement. In some embodiments, the data collection module 320 uses a dot product based algorithm (e.g., as in equation (1)) to determine an angle between acceleration measurements in the data set and between acceleration measurements in the data set and a new acceleration measurement. The data collection module 320 may use a brute force exhaustive search, a binary search algorithm, a nearest neighbor algorithm, or some other algorithm to determine the two closest acceleration measurements that are closest in angle.

The data collection module 320 then combines the two closest acceleration measurements to generate a combined acceleration measurement. The electronic device 100 combines the two closest acceleration measurements using a weighted sum to generate a combined acceleration measurement. In the simplest case, the weights are equal, and the combined acceleration measurement is a linear interpolation between the two acceleration measurements. Alternatively, the electronic device 100 may be configured to weight each of the closest acceleration measurements based on a respective number of acceleration measurements that were previously combined to generate each of the two closest acceleration measurements. In this approach, for each location in the data set, the data collection module 320 maintains a count 'm' of the number of acceleration measurements that were combined to generate the acceleration measurement that occupies each location in the data set, along with the current value $AM_i$ of the vector at that location. For example, assuming one of the two closest acceleration measurements is the new acceleration measurement, $AM_{new}$, and the other of the two closest acceleration measurements is $AM_i$ the data collection module 320 combines the vectors $AM_i$ and $AM_{new}$ as $((m*AM_i)/(m+1)+AM_{new}/(m+1))$. For example, if four acceleration measurements had contributed to an existing combined acceleration measurement in position 1, $AM_1$, and the data collection module 320 is configured to combine it with another acceleration measurement, $AM_{new}$, the new acceleration measurement can be a linear interpolation weighted 80% by the weight of $AM_1$, and 20% by the weight of $AM_{new}$. This is very close to the geometric centroid of all of four acceleration measurements previously combined to generate $AM_1$. The combined acceleration measurement is then placed in the position of the data set formerly occupied by $AM_1$. In embodiments, where the two closest acceleration measurements are both within the data set, the data collection module 320 combines the two acceleration measurement in a similar manner as described above, but now replaces one of the two acceleration measurements with the combined acceleration measurement and replaces the other of the two acceleration measurements with the new acceleration measurement.

By preferentially combining close acceleration measurements and directly including acceleration measurements that improve coverage, the angular coverage of the measurements in the data set gradually becomes more uniform. Additionally, as the number of acceleration measurements that contribute to each combined acceleration measurement increases, the effect of noise and linear acceleration is further reduced.

The data collection module 320 determines that a threshold number of acceleration measurements are in a data set and pass the data set to another module, while additional acceleration measurements are being received. For example, once a threshold number of acceleration measurements less than N are in the data set (e.g., 0.75 N), the data collection module 320 passes the acceleration measurements in the data set to another module which can use the acceleration measurements, while additional measurements are being received. In this manner the data set does not have to be entirely populated with N acceleration measurements before other modules may use the data. Alternatively, in some embodiments, the data collection module 320 populates the entire data set before passing it on to other modules.

The modeling module 330 maintains an accelerometer error correction model that models the effects of the error sources on actual linear acceleration and gravitational components using an accelerometer error correction model ("error correction model"). The error correction model specifies a weight for each of the bias error, the sensitivity error, and the cross-axis error in the presence of a gravitational field. The modeling module 330 uses the error correction model to model the effects of bias error, sensitivity error, and cross-axis error on acceleration measurements. An embodiment of an error correction model that neglects sensor noise is:

$$\hat{a}=S(a-b) \quad (2)$$

where vector a are the acceleration measurements (i.e., uncalibrated data), b is the vector for bias error including bias error calibration parameters, S is a matrix including sensitivity calibration parameters on the matrix diagonals and cross-axis calibration parameters occupying the non-diagonal terms, and â is the estimated acceleration measurement. Accordingly, given a set of calibration values for the calibration parameters, and an acceleration measurement, equation (2) outputs an estimated acceleration measurement—which ideally would match the true acceleration.

The error module 340 determines values for the calibration parameters using the error correction model and the data set. In some embodiments, the electronic device 100 may then use a process similar to that of described below in FIG. 4, but on 3, 6, or 9 parameters instead of 12. For example, the error module 340 may determine values for the bias error calibration parameters, the sensitivity calibration parameters, the cross-axis error calibration parameters, or some combination thereof. Another simplification assumes that the sensitivity matrix is the identity matrix. The lower parameter number calibrations typically remove most of the error associated with the accelerometer 110, but may not provide calibrated measurements that fit as well as the full 12 parameter case described below with reference to FIG. 4. One advantage to calculating a lower number (i.e., less than 12) of calibration values is that it uses less computation than calculating calibration values for the bias error calibration parameters, the sensitivity calibration parameters, and the cross-axis error calibration parameters. Accordingly, calculating the lower number of calibration values may reduce processor load, memory load, power consumption, etc. on the electronic device 100.

The error module 340 initially sets each of the calibration parameters in the error correction model to their respective default values. The default values are set to a value of '1' for sensitivity calibration parameters, and to a value of '0' for bias error and cross-axis calibration parameters—which correspond to the case of no error sources. Alternatively, the default values may be set to some other values (e.g., values associated with typical error values for each error source, or values stored to the accelerometer data store 310 from a previous or factory calibration).

The error module 340 minimizes the error correction model by iteratively perturbing, in a graduated manner, each of the calibration parameters. In some embodiments, these iterative perturbations of the calibration parameters are applied continuously as long as new accelerometer data samples are acquired. In other embodiments, the perturbations are stopped when the error module 340 observes that the calibration parameters have converged such that calibration parameter updates have become progressively smaller and have dropped below a set of threshold values. As described below, the error module 340 first determines values for the bias error calibration parameters. The error module 340 then determines values for the sensitivity calibration parameters while refining the previously determined values for the bias error calibration parameters. The error module 340 then determines values for the cross axis error calibration parameters and finalizes the values for the bias error and sensitivity calibration parameters. In this manner, a rough approximation of values for the bias error calibration parameters are solved for first—which is generally the largest error source—and should help increase the speed at which the values for the remaining calibration parameters and the final values for the bias error calibration error are determined.

An in depth discussion of how each of the calibration parameters is determined is discussed below with reference to FIG. 4. The error module 340 is configured to determine values for the bias error calibration parameters using the accelerometer error correction model and the plurality of acceleration measurements. In brief, the error module 340 first determines values for the bias error calibration parameters using the error correction model and the data set. The error module 340 selects a particular bias error calibration parameter (e.g., Bx) and fixes the remaining calibration parameters. The error module 340 perturbs the selected bias error calibration parameter by a value of A. Specifically, the error module 340 selects 3 separate values for the selected calibration parameter which correspond to a most recent value ($MRV_0$), a most recent value $-\Delta$ ($MRV_{-\Delta}$), and a most recent value $+\Delta$ ($MRV_{+\Delta}$), where $\Delta$ is constant value at a first resolution (e.g., 0.1 millig). The error module 340 determines an estimated acceleration vector for each of the acceleration measurements in the data set using a $MRV_{-\Delta}$ of the particular bias error calibration parameter, a $MRV_0$ of the particular bias error calibration parameter, and a $MRV_{+\Delta}$ of the particular bias error calibration parameter, respectively, to generate three estimated acceleration matrices. The error module 340 determines a modified variance of each of the estimated acceleration matrices. For example, a modified variance, $\sigma$, of an estimated acceleration matrix may be found via:

$$\sigma = \Sigma_{i=1}^{n} [x_i^2 + y_i^2 + z_i^2 - E]^2 \quad (3)$$

Where x is the x component at row i in the estimated acceleration matrix, y is the y component at row i in the estimated acceleration matrix, z is the z component at row i in the estimated acceleration matrix, and E is the expected value which is 1 g. Note, in some embodiments, the sum of $x_i^2 + y_i^2 + z_i^2$ in equation (3) may be replaced with $\sqrt{x_i^2 + y_i^2 + z_i^2}$. The error module 340 selects the value of the bias error calibration parameter that results in the lowest modified variance, and sets the selected value as a new $MRV_0$. The error module 340 then selects new values for $MRV_{+\Delta}$ and $MRV_{+\Delta}$ based on the value of the new $MRV_0$. The error module 340 then calculates the acceleration matrices, calculates modified variances of each estimated acceleration matrix, and identifies which of the $MRV_{-\Delta}$, $MRV_0$, or $MRV_{+\Delta}$, results in the lowest modified variance.

This iterative process of adjusting the $MRV_0$ of the selected bias error calibration parameter continues until the $MRV_0$ (and not the $MRV_{-\Delta}$ or the $MRV_{+\Delta}$) for the particular bias error calibration parameter results in a corresponding minimum modified variance value. The error module 340 then reduces the value of A by X % (e.g., 50% or some other value). The error module 340 repeats the above described iteration for the particular bias error calibration parameter (e.g., Bx) using the new value of $\Delta$ until the $MRV_0$ for the particular bias error calibration parameter results in the minimum modified variance value, and not the $MRV_{-\Delta}$ or the $MRV_{+\Delta}$. The value of A may be reduced again, and the above process repeated in a progressive manner, until the lowest calculated modified variance value of the estimated acceleration matrices is less than or equal to a bias error calibration threshold (e.g., 0.1 millig). The bias error calibration threshold determines how precise a value is determined for a bias error calibration parameter. The bias error calibration threshold may be, e.g., a number set by an administrator, or a number set by the bit resolution of the electronic device 100. An intermediate value is a value of a calibration parameter that results in a lowest modified variance of an acceleration matrix for a given iteration. Once the bias error calibration threshold is reached, the electronic device 100 sets the particular bias error calibration parameter (e.g., Bx) as the intermediate value.

The error module 340 then updates the perturbed calibration parameter (Bx) with the selected value, and selects a different bias error calibration parameter (e.g., By or Bz) for perturbation, and repeats the above process for the newly selected calibration parameter, and so on. In this manner, the error module 340 cycles through each of the bias error calibration parameters until, for all three calibration parameters, the most recent values ($MRV_0$) of the calibration parameters result in minimum modified variance values that are less than or equal to the bias error calibration threshold.

Conceptually, the modified variance values (V) are such that there are three possible configurations: (1) increasing (e.g., $V_{\Delta-} < V_0 < V_{\Delta+}$); a (2) decreasing (e.g., $V_{\Delta-} > V_0 > V_{\Delta+}$); or (3) minimum (e.g., $V_{\Delta-} > V_0 < V_{\Delta+}$). Essentially, the iterative perturbation described above, determines values of the bias error calibration parameters that result in a minimum configuration, reduces $\Delta$, and again determines values of the bias error calibration parameters that result in a minimum configuration, and so on. In this manner an initial values of the bias error calibration parameters are found. Additionally, as error module 340 continues to refine the initial values of the bias error calibration parameters, as described below, during the determination of the values for the sensitivity calibration parameters and the cross-axis error calibration parameters.

The error module 340 is configured to determine values for sensitivity calibration parameters that specify weight for the sensitivity error, and refine the determined values for the bias error calibration parameters using the accelerometer error correction model and the plurality of acceleration measurements. The error module 340 determines values for the sensitivity calibration parameters and refines the values for the bias error calibration in a manner similar to that described above for determining values for the bias error calibration parameters. The difference being that now the three sensitivity calibration parameters are perturbed as well as the three bias error calibration parameters. Additionally, the sensitivity calibration parameters are perturbed by $\gamma$, and $\gamma$ is constant value at a first resolution (e.g., 0.01) and may be different from $\Delta$. The error module 340 iteratively perturbs the sensitivity calibration parameters and the bias error calibration parameters until (1) for all the sensitivity calibration parameters the most recent values ($MRV_0$) of the sensitivity calibration parameters result in minimum modified variance values that are less than or equal to a sensitivity error calibration threshold, and (2) the most recent values ($MRV_0$) of all of the bias error calibration parameters result in minimum modified variance values that are less than or equal to the bias error calibration threshold. The sensitivity calibration threshold determines how precise a value is determined for a sensitivity calibration parameter. The sensitivity error calibration threshold may be, e.g., a number set by an administrator, or a number set by the bit resolution of the electronic device 100.

The error module 340 is configured to determine calibration values for the cross-axis error calibration parameters, and refine the determined values of the sensitivity calibration parameters and the bias error calibration parameters using the error correction model and the plurality of acceleration measurements. The error module 340 determines values for the cross-axis error calibration parameters and refines the values for the bias error calibration parameters and sensitivity calibration parameters in a manner similar to that described above, except each of the 12 calibration are perturbed. For example, the error module 340 sequentially perturbs the 6 cross axis error calibration parameters, the 3 sensitivity calibration parameters, and the 3 bias error calibration parameters.

The values of the cross-axis error calibration parameters are perturbed by Γ, the sensitivity calibration parameters are perturbed by γ, and the bias error calibration parameters are perturbed by Δ, and Γ is constant value at a first resolution and may be different from Δ and/or γ. The error module 340 iteratively perturbs, in a graduated manner (i.e., progressively reducing the size of Δ, γ, and/or Γ) each of the calibration parameters until (1) the most recent values (MRV$_0$) of each of the cross-axis error calibration parameters result in minimum modified variance values that are less than or equal to a cross-axis error calibration threshold; (2) the most recent values (MRV$_0$) of each of the sensitivity calibration parameters result in minimum modified variance values that are less than or equal to the sensitivity error calibration threshold; and (3) the most recent values (MRV$_0$) of each of the bias error calibration parameters result in minimum modified variance values that are less than or equal to the bias error calibration threshold. The values of the calibration parameters once (1), (2), and (3) are met are referred to as calibration values for the calibration parameters. The cross-axis error calibration threshold determines how precise a value is determined for a cross-axis error calibration parameter. The cross-axis error calibration threshold may be, e.g., a number set by an administrator, or a number set by the bit resolution of the electronic device 100.

The error correction module 320 determines a calibration quality metric ("C") using the determined calibration values. The calibration quality metric may be used by the application 110, and/or the electronic device 100 to make a quantitative assessment of the quality of the calibration of the acceleration measurements. The calibration quality metric is a figure of merit that combines how well the data points cover the sphere (e.g., via m$_1$) with how small the standard deviation of the magnitude is from the expected value of Earth's gravity (e.g., via m$_2$). For example:

$$C = m_1 * m_2 \text{ where} \quad (4)$$

$$m_1 = \frac{(x_{max} - x_{min}) * (y_{max} - y_{min}) * (z_{max} - z_{min})}{(2*\text{Gravity}_{Earth})^3} \quad (5)$$

$$m_2 = \log_2\left(\frac{1}{\text{Variance}}\right) \quad (6)$$

and x$_{max}$, y$_{max}$, and z$_{max}$ are, respectively, the maximum x, y, and z components of the calibrated acceleration matrix in g, x$_{min}$, y$_{min}$, and z$_{min}$ are, respectively, the minimum x, y, and z components of the calibrated acceleration matrix in g, and Gravity$_{Earth}$ is Earth's gravity in g (i.e., 1 g), and $$\text{Variance} = \frac{\sum_{i=1}^{n}[ax_i^2 + ay_i^2 + az_i^2 - \text{Gravity}_{Earth}]^2}{n} \quad (7)$$

where ax is the x component at row i in the calibrated acceleration matrix, ay is the y component at row i in the calibrated acceleration matrix, az is the z component at row i in the calibrated acceleration matrix, and n is the number of acceleration measurements in the data set. Note, in some embodiments, the sum of $ax_i^2 + ay_i^2 + az_i^2$ in equation (7) may be replaced with $$\sqrt{ax_i^2 + ay_i^2 az_i^2}. \quad (8)$$

m$_1$ generally represents how well the calibrated acceleration measurements in the data set cover a uniform sphere with a 1 g radius. The error correction module 320 identifies a minimum and a maximum value of the x, y, and z components within the calibrated acceleration matrix. In the ideal case the min and max values for x, y, and z, would be 1 g and −1 g, in practice the values are likely very close to 1 g or −1 g. Additionally, with regard to m$_2$, in this embodiment, the log$_2$ of the inverse of the Variance is used because it results in a monotonically increasing function, that gives a higher value as the variance gets smaller.

Accordingly, C is some scalar number along a range of numbers. In some embodiments, the range of numbers is partitioned into different segments that each correspond to different levels of quality. For example, low quality, good quality, and excellent quality may correspond to, respectively, greater than 5% error between actual acceleration measurements and the calibrated acceleration measurements, between 5% and 1% error between actual acceleration measurements and the calibrated acceleration measurements, and less than 1% error between actual acceleration measurements and the calibrated acceleration measurements. Continuing with the above example, C values from 0 to 1000 may correspond to low quality calibration, from 1001 to 4000 may correspond to good calibration quality metric, and greater than 4000 may correspond to excellent calibration quality metric. Accordingly, the C value may provide a simple metric that evaluates the quality of the calibration which may be achieved using the calibration values and the error correction model.

The application interface module 350 is configured to determine a true acceleration vector that corresponds to a subsequently received acceleration measurement using the determined calibration values and the error correction model. For example, the application interface module 350 may use equation (2) and the calibration values to calibrate the subsequently received acceleration measurement.

In some embodiments, the application interface module 350 provides 440 the calibration quality metric and/or one or more the calibration values to the application 110. Using the calibration values and equation (2), the application interface module 350 is able to solve for an estimated acceleration measurement â given an acceleration measurement a. In some embodiments, the application interface module 350 provides some, but not all of the calibration values to the application 110. For example, the application interface module 350 may provide the calibration values for the bias error and sensitivity calibration parameters, but not the cross term error calibration parameters. In alternate embodiments, the application interface module 350 may provide one or more of the calibration values, but not the calibration quality metric. Also, in alternate embodiments, the application interface module 350 may provide the error correction model and/or one or more of the calibration values to the application 110. In some embodiments the application interface module 350 updates a register on the accelerometer 110 with values of the calibration parameters, which then updates an on-board version of and/or equation (2) with the determined values for the calibration parameters.

The monitoring module 360 monitors one or more recalibration conditions. A recalibration condition is a condition that if met, causes the electronic device 100 to re-calibrate the accelerometer 110. A recalibration condition may be, e.g., a change in temperature of the electronic device 100 beyond a range of temperatures that relative to a temperature of the electronic device 100 during a previous calibration, an elapsed time since the previous calibration of the accelerometer (e.g., more than a week), a number of power cycles (e.g., more than 1), a user input (e.g., user manually requests re-calibration of the accelerometer 110), some other condition, or some combination thereof. The monitoring module 360 monitors the one or more recalibration conditions, and if a recalibration condition is met causes the electronic device 100 to re-calibrate the accelerometer 110.

For example, once the calibrated values of the calibration parameters are determined, the monitoring module 360 may associate a calibration temperature with the set of calibration values. The calibration temperature is the temperature at which the calibrated values were determined as is determined using temperature measurements received from the temperature sensor 125. The calibration temperature may be, e.g., an average temperature of the accelerometer 110 while the calibrated values were determined, or some temperature (e.g., highest, lowest, etc.) of the accelerometer 110 that occurred while the calibrated values were determined. The monitoring module 360 monitors subsequent temperature measurements from the temperature sensor 125, and if a temperature measurement deviates by more than a temperature threshold (e.g., ±5 degrees C.), causes the electronic device 100 to re-calibrate the accelerometer 110.

In some embodiments, once the calibrated values of the calibration parameters are determined, the monitoring module 360 may associate a calibration date with the set of calibration values. The calibration date is the date/time at which the calibrated values were determined. The monitoring module 360 compares the current date/time with the calibration time, and if a threshold time (e.g., a day, week, etc.) has elapsed since the calibration time, causes the electronic device 100 to re-calibrate the accelerometer 110.

In some embodiments, once the calibrated values of the calibration parameters are determined, the monitoring module 360 may start tracking a number of power cycles since the set of calibration values were determined. The monitoring module 360 compares a current number of power cycles with a threshold number (e.g., 5, 10, some other number, etc.), and if the current number of power cycles equals the threshold number, causes the electronic device 100 to re-calibrate the accelerometer 110.

Figure 4:
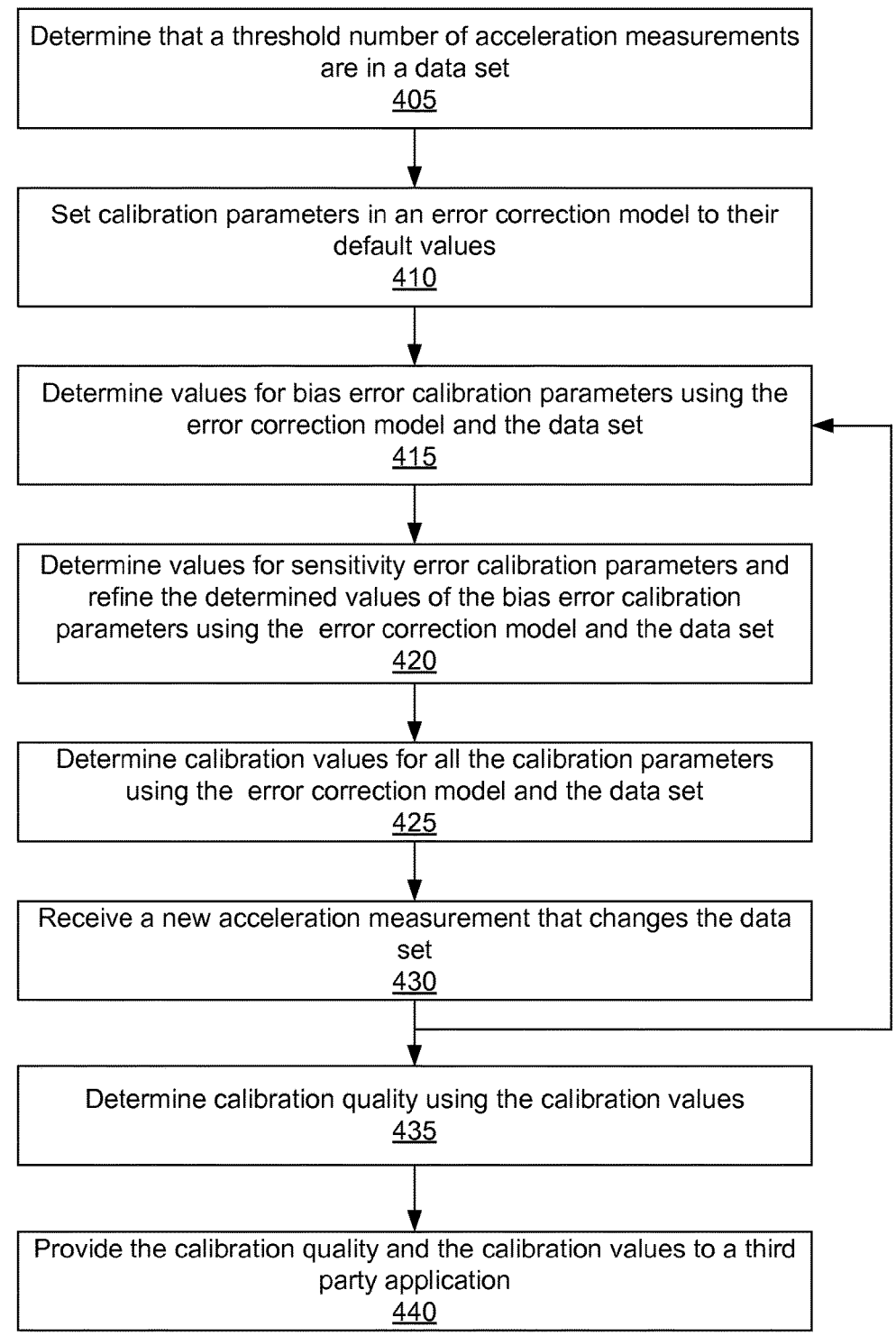
FIG. 4 is a flowchart illustrating a process of performing real-time accelerometer calibration according to one embodiment.

FIG. 4 is a flowchart illustrating a process 400 of performing real-time accelerometer calibration according to one embodiment. The process of FIG. 4 is performed by the electronic device 100. Likewise, embodiments may include different and/or additional steps, or perform the steps in different orders.

The electronic device 100 determines 410 that a threshold number of acceleration measurements are in a data set. The data set holds a maximum of 'N' acceleration measurements, and 'n' is the number of actual acceleration measurements in the data set. For example a data set may include 128 spaces for acceleration measurements. The threshold number is a number of spaces in the data set that should be filled in order to ensure that the process is able to determine a solution for each of the calibration parameters. Additional details regarding how the data set is populated with acceleration measurements is described below with regard to FIG. 5.

The electronic device 100 sets 410 each of the calibration parameters in an accelerometer error correction model ("error correction model") to their respective default values. The error correction model may be, for example, equation (2). The error correction model includes values for bias error calibration parameters, sensitivity calibration parameters, and cross-axis calibration parameters. For example, the electronic device 100 may set the values of the bias error calibration parameters and the cross-axis calibration parameters to '0' and the values of the sensitivity calibration parameters to '1.'

The electronic device 100 determines 415 values for the bias error calibration parameters using the error correction model and the data set. The electronic device 100 selects a particular bias error calibration parameter (e.g., Bx) and fixes the remaining calibration parameters. The electronic device 100 perturbs the selected bias error calibration parameter by a value of A. Specifically, the electronic device 100 selects 3 separate values for the selected calibration parameter which correspond to a most recent value ($MRV_0$), a most recent value $-\Delta$ ($MRV_{-\Delta}$), and a most recent value $+\Delta$ ($MRV_{+\Delta}$), where $\Delta$ is constant value at a first resolution (e.g., 0.1 millig). The electronic device 100 determines an estimated acceleration vector for each of the acceleration measurements in the data set using a $MRV_{-\Delta}$ of the particular bias error calibration parameter, a $MRV_0$ of the particular bias error calibration parameter, and a $MRV_{+\Delta}$ of the particular bias error calibration parameter, respectively, to generate three estimated acceleration matrices, $\hat{A}_{-\Delta}$, $\hat{A}_0$, and $\hat{A}_{+\Delta}$. For example, $\hat{A}_0$ is shown below, $$\hat{A}_0 = \begin{bmatrix} \hat{a}_{x1} & \hat{a}_{y1} & \hat{a}_{z1} \\ \vdots & \vdots & \vdots \\ \hat{a}_{xn} & \hat{a}_{yn} & \hat{a}_{zn} \end{bmatrix} \tag{9}$$

All of the estimated acceleration matrices have the same number of rows (i.e., 'n' the number of acceleration measurements in the data set) and columns.

The electronic device 100 determines a modified variance for each of the three estimated acceleration matrices, $\hat{A}_{-\Delta}$, $\hat{A}_0$, and $\hat{A}_{+\Delta}$. For example, a modified variance, σ, of an estimated acceleration matrix may be found using equation (3). The electronic device 100 then selects the value of the bias error calibration parameter that results in the lowest modified variance, and sets the selected value as a new $MRV_0$. For example, if the modified variances of the set of row vectors of $\hat{A}_{-\Delta}$, $\hat{A}_0$, and $\hat{A}_{+\Delta}$ are 0.3, 0.2, and 0.01, respectively, the electronic device 100 selects the $MRV_{+\Delta}$ of the bias error calibration parameter, and then sets a new value of $MRV_0$ as being the value of $MRV_{+\Delta}$ because the corresponding estimated acceleration matrix, $\hat{A}_{+\Delta}$, resulted in the lowest modified variance value. The electronic device 100 then selects new values for $MRV_{+\Delta}$ and $MRV_{+\Delta}$ based on the value of the new $MRV_0$. The electronic device 100 then calculates the acceleration matrices, calculates modified variances of each estimated acceleration matrix, and identifies which of the $MRV_{-\Delta}$, $MRV_0$, or $MRV_{+\Delta}$ results in the lowest modified variance.

This iterative process of adjusting the $MRV_0$ of the selected bias error calibration parameter continues until the $MRV_0$ (and not the $MRV_{-\Delta}$ or the $MRV_{+\Delta}$) for the particular bias error calibration parameter results in a corresponding minimum modified variance value. The electronic device 100 then reduces the value of Δ by X % (e.g., 50% or some other value). The electronic device 100 then repeats the above described iteration for the particular bias error calibration parameter (e.g., Bx) using the new value of Δ until the $MRV_0$ for the particular bias error calibration parameter results in the minimum modified variance value, and not the $MRV_{-\Delta}$ or the $MRV_{+\Delta}$. The value of A may be reduced again, and the above process repeated, until the lowest calculated modified variance value of the estimated acceleration matrices is less than or equal to a bias error calibration threshold (e.g., 0.1 millig). The bias error calibration threshold may be, e.g., a number set by an administrator, or a number set by the bit resolution of the electronic device 100. An intermediate value is a value of a calibration parameter that results in a lowest modified variance of an acceleration matrix for a given iteration. Once the bias error calibration threshold is reached, the electronic device 100 sets the particular bias error calibration parameter (e.g., Bx) as the intermediate value.

The electronic device 100 then selects a different bias error calibration parameter (e.g., By or Bz) for perturbation. The electronic device 100 repeats the above process for the newly selected bias error calibration parameter (e.g., By) to identify a corresponding intermediate value. Once complete, the electronic device 100 sets a value of the different bias error calibration parameter (e.g., By) to the corresponding intermediate value, and then selects a remaining bias error calibration parameter (e.g., Bz) for perturbation. The electronic device 100 repeats the above process for the last remaining error calibration parameter (e.g., Bz) to identify a corresponding intermediate value. The electronic device 100 continues to cycle through each of the bias error calibration parameters until, for all three calibration parameters, the most recent values ($MRV_0$) of the calibration parameters result in minimum modified variance values that are less than or equal to the bias error calibration threshold.

The electronic device 100 determines 420 values for sensitivity calibration parameters and refines the determined values for the bias error calibration parameters using the error correction model and the data set. Step 420 is substantially similar to step 415, except in addition to the bias error calibration parameters, the sensitivity calibration parameters are also being perturbed. The electronic device 100 iteratively perturbs, in a graduated manner (i.e., progressively reducing the size of $\Delta$ and/or $\gamma$), each value of the sensitivity calibration parameters and the determined values of bias error calibration parameters. For example, the electronic device 100 sequentially perturbs the 3 sensitivity calibration parameters and the 3 bias error calibration parameters. The sensitivity calibration parameters are perturbed by $\gamma$, and the bias error calibration parameters are perturbed by $\Delta$. The electronic device 100 iteratively perturbs the sensitivity calibration parameters and the bias error calibration parameters until for all the sensitivity calibration parameters and the bias error calibration parameters the most recent values ($MRV_0$) of the sensitivity calibration parameters result in minimum modified variance values that are less than or equal to a sensitivity error threshold and the most recent values ($MRV_0$) of the bias error calibration parameters result in minimum modified variance values that are less than or equal to the bias error threshold.

The electronic device 100 determines 425 calibration values for all calibration parameters (including cross-axis error) using the error correction model and the data set. Step 425 is substantially similar to steps 420 and 415, except in addition to the bias error calibration parameters and the sensitivity calibration parameters, the cross-axis error calibration parameters are also being perturbed. For example, the electronic device 100 sequentially perturbs the 6 cross axis error calibration parameters, the 3 sensitivity calibration parameters, and the 3 bias error calibration parameters. The values of the sensitivity calibration parameters and the bias error calibration parameters are refined, via continued perturbation, to account for possible changes in the minimization of the modified variances due to changes in the values of the cross-axis error calibration parameters.

The values of the cross-axis error calibration parameters are perturbed by $\Gamma$, the sensitivity calibration parameters are perturbed by $\gamma$, and the bias error calibration parameters are perturbed by $\Delta$. The electronic device 100 iteratively perturbs, in a graduated manner (i.e., progressively reducing the size of $\Delta$, $\gamma$, and/or $\Gamma$) each of the calibration parameters until (1) the most recent values ($MRV_0$) of each of the cross-axis error calibration parameters result in minimum modified variance values that are less than or equal to a cross-axis error calibration threshold; (2) the most recent values ($MRV_0$) of each of the sensitivity calibration parameters result in minimum modified variance values that are less than or equal to the sensitivity error threshold; and (3) the most recent values ($MRV_0$) of each of the bias error calibration parameters result in minimum modified variance values that are less than or equal to the bias error threshold. The values of the calibration parameters once (1), (2), and (3) are met are referred to as calibration values for the calibration parameters.

The electronic device 100 receives 430 a new acceleration measurement that changes the data set. The process 400 is continually receiving new measurements, and as discussed in detail below with regard to FIG. 5 some of the new acceleration measurements may be used to update the acceleration measurements in the data set. Accordingly, the process flow moves to step 415, and steps 415, 420, 425, and 430 are looped such that the electronic device 100 is always refining the determined calibration values.

The electronic device 100 determines 435 a calibration quality metric using the determined calibration values. The electronic device 100 calculates a calibration quality metric ("C") using equations (4), (5), (6), and (7).

The electronic device 100 updates the error correction model with the calibration parameters, and determines calibrated acceleration measurements for each of the acceleration measurements in the data set to form a calibrated acceleration matrix. The electronic device 100 determines a first metric, $m_1$, that generally represents how well the calibrated acceleration measurements in the data set cover a uniform sphere with a 1 g radius. The electronic device 100 identifies a minimum and a maximum value of the x, y, and z components within the calibrated acceleration matrix (will be close to 1 g or −1 g). The electronic device 100 then calculates $m_1$, using for example equation (5). The electronic device 100 then determines a variance of the calibrated acceleration matrix, using, for example equation (7). The electronic device 100 then calculates a second metric, $m_2$, using equation (6). Once $m_1$ and $m_2$ are calculated the electronic device 100 calculates C using equation (4).

The electronic device 100 provides 440 the calibration quality metric and the calibration values to the application 110. For example, the electronic device 100 may provide the calibration quality metric and the calibration values to a fitness tracking application operating on the electronic device 100. In some embodiments, the electronic device 100 provides some, but not all of the calibration values to the third party application. For example, the electronic device 100 may provide the calibration values for the bias error and sensitivity calibration parameters, but not the cross term error calibration parameters. In alternate embodiments, the electronic device 100 may provide one or more of the calibration values, but not the calibration quality metric. Also, in alternate embodiments, the electronic device 100 may provide the error correction model and/or one or more of the calibration values to the third party application. In alternate embodiments the electronic device 100 updates a register on the accelerometer 110 with values of the calibration parameters, which then updates an on-board version of and/or equation (2) with the determined values for the calibration parameters.

Once the calibration values are determined, the electronic device 100 is able to determine an estimated acceleration measurement for each newly received acceleration measurement. The received acceleration measurement corresponds to an estimated acceleration vector that includes an error component composed of bias error, sensitivity error, cross-axis error, or some combination thereof. The electronic device 100 inputs the acceleration measurement into the updated error correction model to get an estimated acceleration measurement that may be represented as an estimated acceleration vector. The true acceleration vector being offset from the estimated acceleration vector by the error component present in the estimated acceleration vector. As the calibration becomes progressively better, the estimated acceleration vector converges to a true acceleration measurement as the error component converges to some small value (e.g., 0.1%). Accordingly, the true acceleration vector may be approximated by the estimated acceleration vector.

Moreover, as the value of C increases, at some threshold value, the electronic device 100 may modify one or more of the population conditions to tighten entry requirements for acceleration measurements to the data set. For example, the electronic device 100 may reduce the maximum linear acceleration from ±50 millig to ±25 millig.

Additionally, in some embodiments, the electronic device 100 continually monitors whether a recalibration parameter is met. If a recalibration parameter (e.g., elapsed time since previous calibration of the accelerometer 110) is met, the process 400 moves to step 410 and the accelerometer 110 is recalibrated.

Figure 5:
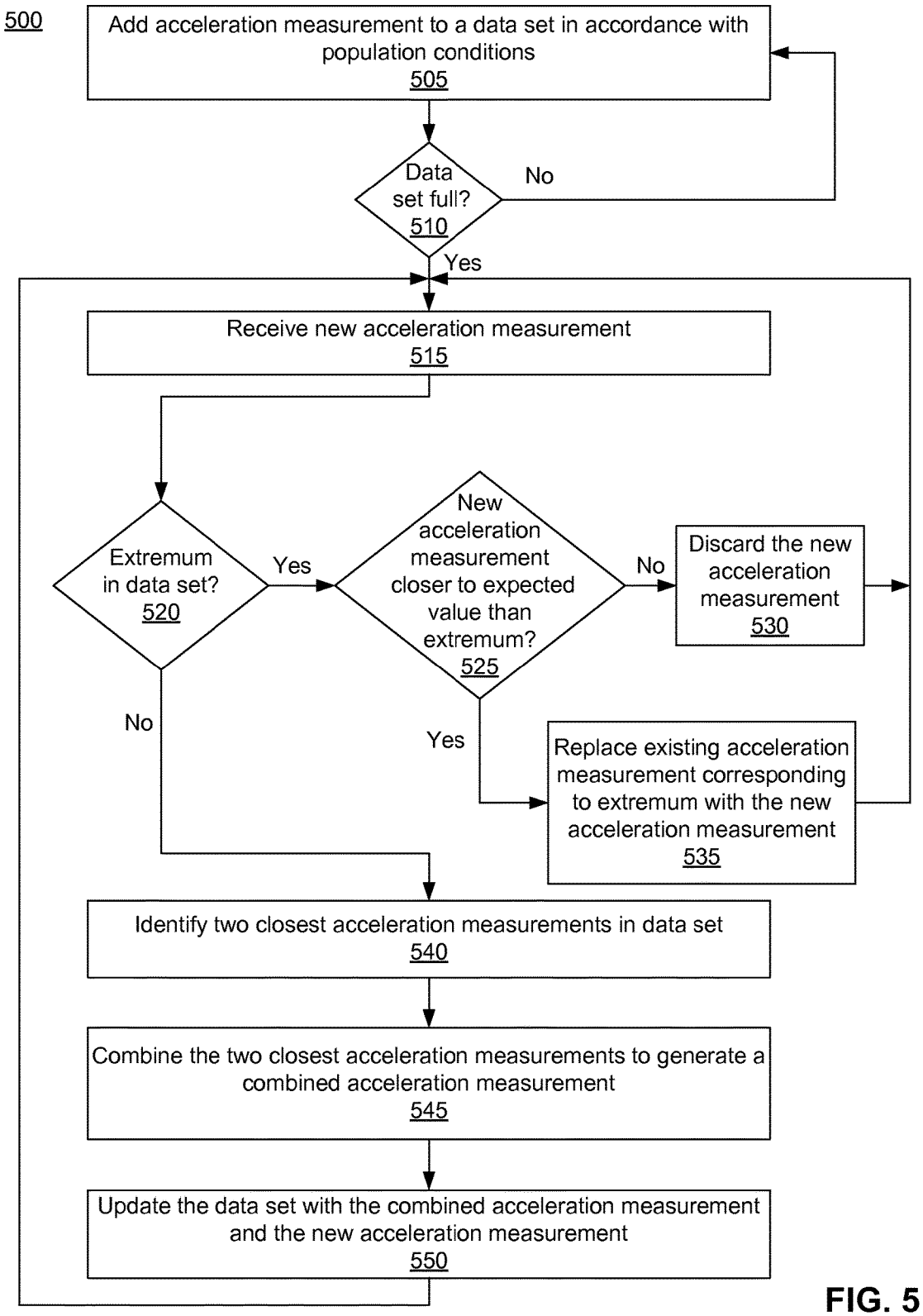
FIG. 5 is a flowchart illustrating a process of populating a data set according to one embodiment.

FIG. 5 is a flowchart illustrating a process 500 of populating a data set according to one embodiment. The process of FIG. 5 is performed by the electronic device 100. Likewise, embodiments may include different and/or additional steps, or perform the steps in different orders.

Initially, the data set includes zero acceleration measurements, and may contain a total of N acceleration measurements. For example a data set may include 128 spaces for acceleration measurements.

The electronic device 100 adds 505 an acceleration measurement to a data set in accordance with population conditions. The population conditions control whether or not the acceleration measurement is added to the data set. The population conditions include a maximum linear acceleration (e.g., between ±50 millig) within a specified period of time and a minimum threshold angle between the received acceleration measurement and any of the acceleration measurements already present in the data set. In alternate embodiments, the population conditions may additionally include, some other property of an acceleration measurement, the number of acceleration measurements in the data set, or some combination thereof.

Once a new acceleration measurement is received, the electronic device 100 determines whether the population conditions are met. For example, as noted above, an acceleration measurement may be broken into a gravitational acceleration component, a liner acceleration component, and an angular acceleration component. As the angular acceleration component is generally very small it may be neglected, as the gravitational component is known —the electronic device 100 is able to determine the linear acceleration of the received acceleration measurement. Moreover, the electronic device 100 determines how long the linear acceleration is within the maximum allowed value (e.g., between ±50 millig) by comparing the linear acceleration component to linear acceleration components determined from one or more previously received acceleration measurements.

As mentioned above, another population condition is that there is at least a minimum threshold angle (e.g., 7.5 degrees) between the received acceleration measurement and the acceleration measurements already present in the data set, the electronic device 100. For example, the electronic device 100 uses a dot product based algorithm (e.g., as in equation (1)) to determine that the received acceleration measurement is at least the minimum threshold angle between each of the acceleration measurements already in the data set. For example, the electronic device 100 may use equation (1) to determine a set of angles between a new acceleration measurement, $AM_{new}$, and each of the acceleration measurements in the data set, $[AM_1 \ldots AM_N]$. The electronic device 100 identifies a minimum angle in the set of angles, and if the minimum angle is greater than the threshold angle value, the population condition is met. If the minimum angle is less than the threshold angle value, the population condition is not met and $AM_{new}$ is not added to the data set—even though it may have satisfied other population conditions. Once the electronic device 100 has determined that all of the population conditions are met, the received acceleration measurement is added to the data set.

The electronic device 100 then determines 510 whether the data set is full. The data set is full if there are no spaces left in the data set. For example, the electronic device 100 determines whether there are N spaces filled in the data set. If the data set still has empty spaces, the process flow moves to step 505 and the electronic device 100 populates the data set in accordance with the population conditions until the data set is full. Once the electronic device 100 determines 510 that the data set is full the process flow moves to step 515.

The electronic device 100 receives 515 a new acceleration measurement. In this context, the new acceleration measurement is an acceleration measurement that is received after the data set is full. Steps 520-550 determine how the electronic device 100 processes the new acceleration measurement.

The electronic device 100 determines 520 whether there are any extremum in the data set. The electronic device 100 uses the error correction model to generate an estimated acceleration measurement for each of acceleration measurements ("$a_{existing}$") in the data set. The estimated acceleration measurements of the existing acceleration measurements in the data set all should have a magnitude relatively close to an expected value (e.g., 1 g). The electronic device 100 determines a magnitude for each of the existing acceleration measurements, and identifies an $a_{existing}$ having the maximum magnitude ("Max") and an $a_{existing}$ having the minimum magnitude ("Min"). The electronic device 100 determines (1) whether the Max value is below a maximum threshold value, and determines (2) whether the Min value is greater than a minimum threshold value. If (1) and (2) are satisfied, the process flow moves to step 540. In contrast, if (1) and/or (2) are not satisfied the process flow moves to step 525.

In step 525, the electronic device 100 determines 525 whether the new acceleration measurement is closer to the expected value than the extremum. For example, the electronic device 100 uses the error correction model to generate an estimated acceleration measurement for the new acceleration measurement ("$a_{new}$"). The electronic device 100 determines a magnitude of $a_{new}$, and if the determined magnitude is greater than or equal to Max or less than or equal to Min, the new measurement is not closer to the expected value than the extremum and the process flow moves to step 530. At step 530, the electronic device 100 discards 530 the new acceleration measurement and the process flow moves to step 515.

In contrast, if the determined magnitude is less than Max or greater than Min, the new acceleration measurement is closer to the expected value, and the process moves to step 535. At step 535 the electronic device 100 replaces 535 an existing acceleration measurement in the data set corresponding to the extremum with the new acceleration measurement, and the process flow moves to step 515.

Once the electronic device 100 determines 520 that there are no extremum in the data set, the electronic device 100 identifies 540 two acceleration measurements that are closest to each other in angle within the data set (also referred to as "two closest acceleration measurements"). The two closest acceleration measurements include at least acceleration measurement from the data set, and may include the new acceleration measurement. In some embodiments, the electronic device 100 uses a dot product based algorithm (e.g., as in equation (1)) to determine an angle between each and every acceleration measurements in the data set and each and every acceleration measurements in the data set and the new acceleration measurement. In other embodiments, the electronic device 100 may use other, possibly more efficient, but more complex algorithms to identify the two closest acceleration measurements. For example, the electronic device 100 may use a binary search algorithm, a nearest neighbor algorithm, or some other algorithm to determine the two closest acceleration measurements that are closest in angle.

The electronic device 100 combines 545 the two closest acceleration measurements to generate a combined acceleration measurement. In some embodiments, the electronic device 100 combines the two closest acceleration measurements using a weighted sum to generate a combined acceleration measurement. In some embodiments, the weight of the two closest acceleration measurements are equal. Alternatively, as described above with regard to FIG. 3, in some embodiments, the electronic device 100 may be configured to weight each of the closest acceleration measurements based on a respective number of acceleration measurements that were previously combined to generate each of the two closest acceleration measurements. For example, if a first acceleration measurement was previously generated by a combination of 4 different acceleration measurement, and the second acceleration measurements is the new acceleration measurement, the electronic device 100 weights the first acceleration more than the second acceleration measurement.

The electronic device 100 updates 550 the data set with the combined acceleration measurement and the new acceleration measurement. In embodiments, where the two closest acceleration measurements are existing acceleration measurements in the data set each of the two closest acceleration measurements are associated with a respective space in the data set. The electronic device 100 replaces one of the two closest acceleration measurements with the combined acceleration measurement and replaces the other of the two the new acceleration measurements with the new acceleration measurement. In the case where one of the two closest acceleration measurements is the new acceleration measurement, the electronic device 100 replaces the existing acceleration measurement in the data set with the combined acceleration measurement. The process flow then moves to step 515, and the electronic device 100 receives another new acceleration measurement.

Figure 6:
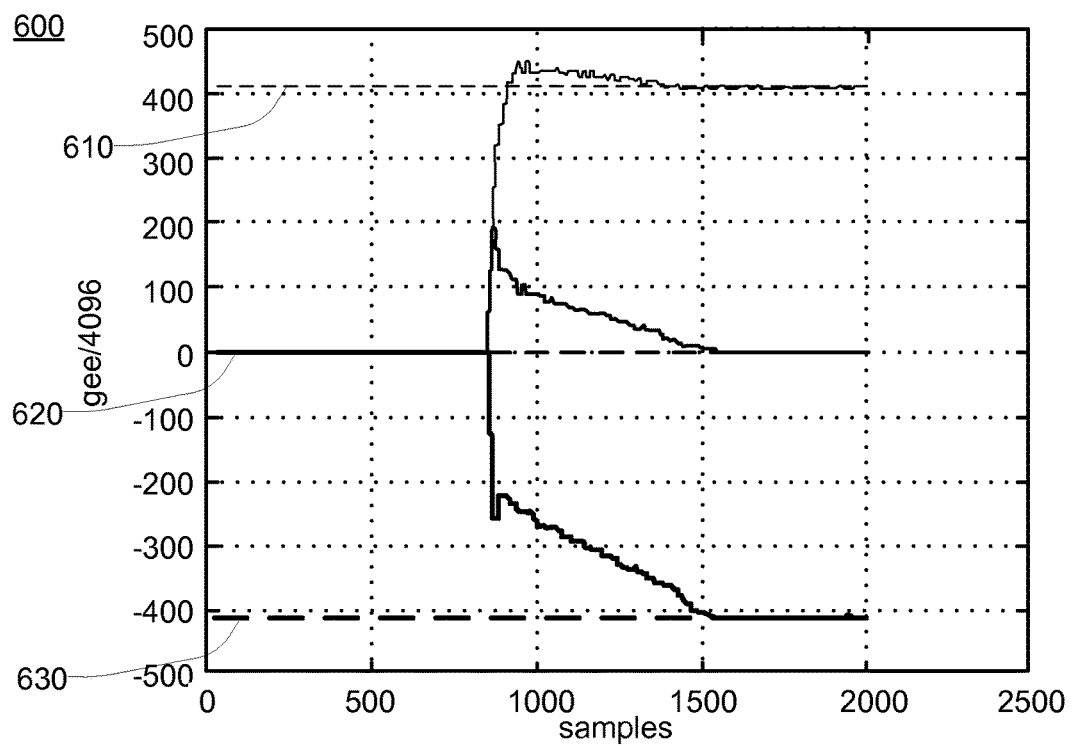
FIG. 6 is an example plot showing bias calibration convergence toward reference truth for x, y, and z axis.

Turning now to simulated examples showing convergence for the error sources, FIG. 6 is an example plot 600 showing bias calibration convergence toward reference truth for x, y, and z axis. The plot 600 shows three different simulated sources of bias error: source 610, source 620, and source 630. Source 610 corresponds to a simulated 100 millig bias error (i.e., 409.6 g/4096), source 620 corresponds to a simulated 0 millig bias error, and source 630 corresponds to a simulated −100 millig bias error (i.e., −409.6 g/4096). In plot 600 it is apparent that after approximately 1600 samples (i.e., sequential outputs from the accelerometer 110) the calibration has converged to values close to the values of the sources 610, 620, and 630. Note, in this example, the data set includes 128 acceleration measurements (i.e., N=128).

Figure 7:
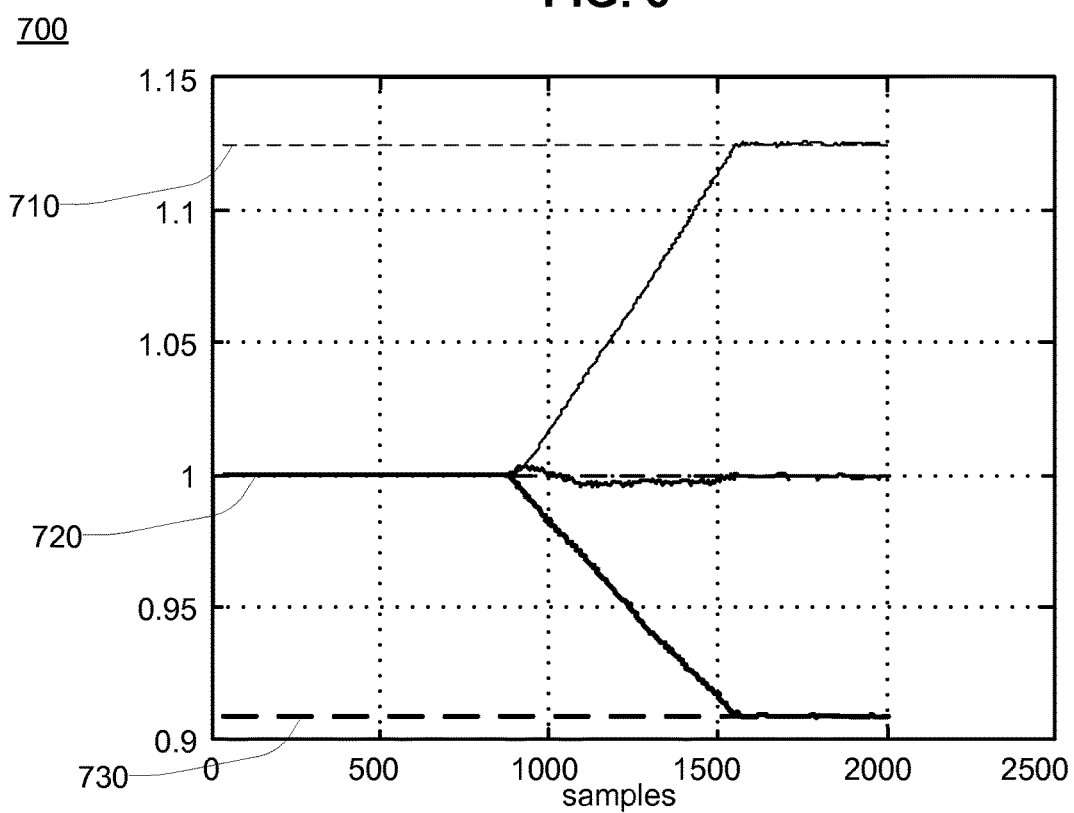
FIG. 7 is an example plot showing sensitivity calibration convergence toward reference truth for x, y, and z axis.

FIG. 7 is an example plot 700 showing sensitivity calibration convergence toward reference truth for x, y, and z axis. The plot 700 shows three different simulated sources of sensitivity error, source 710, source 720, and source 730. Source 710 corresponds to a simulated sensitivity of 1.125 (+12.5% error), source 720 corresponds to a simulated sensitivity of 1 (no error), and source 730 corresponds to a simulated sensitivity of 0.91 (−9% error). In plot 700 it is apparent that after approximately 1600 samples the calibration has converged to values close to the values of the sources 710, 720, and 730. Note, in this example, the data set includes 128 acceleration measurements (i.e., N=128).

Figure 8:
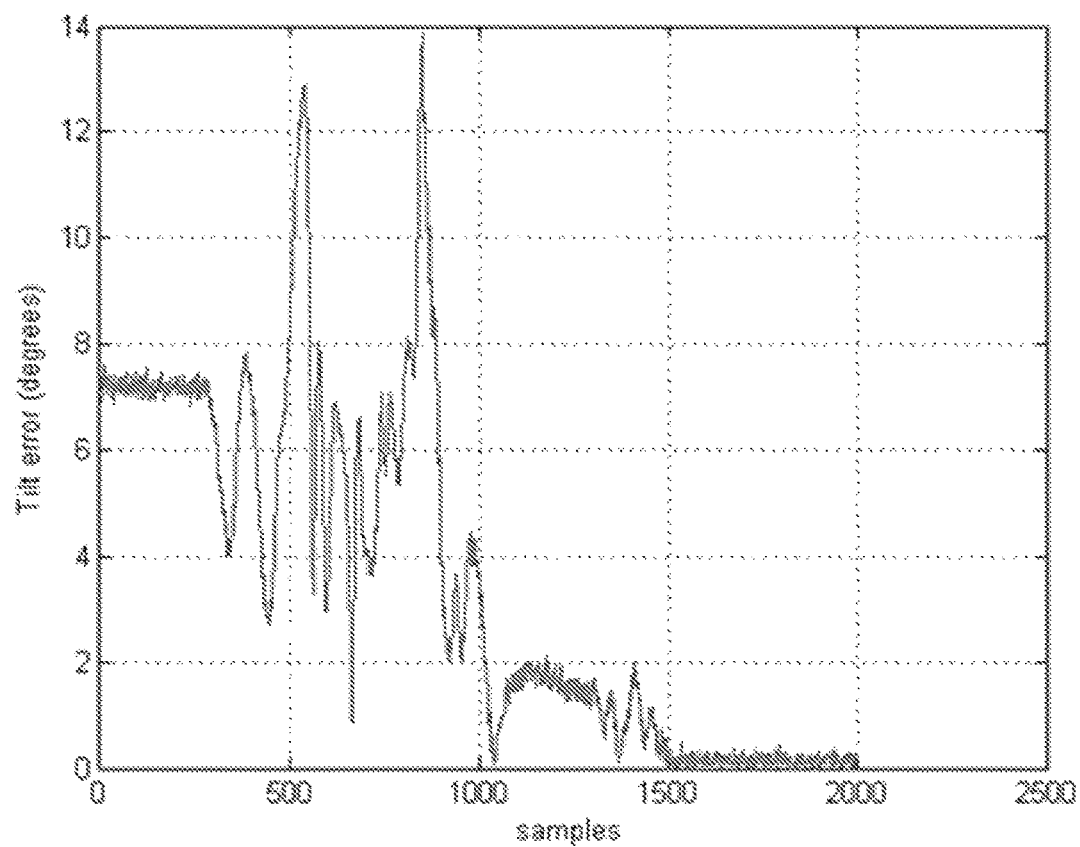
FIG. 8 is an example plot showing calibration convergence in terms of tilt angle

FIG. 8 is an example plot 800 showing calibration in terms of tilt angle. Plot 800 is based on the same data set that was used to generate FIGS. 6 and 7, and accordingly, also includes bias error and sensitivity error. Uncalibrated the tilt error is approximately 7 degrees, however, once calibration has occurred the tilt error is approximately 0.2 degrees. At a sample rate of 100 Hz, this means it takes approximately 16 seconds to calibrate the accelerometer 110 for the simulated conditions.

OTHER CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, media feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for real-time calibration of accelerometers. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. An electronic device, the device comprising:
    an accelerometer that outputs acceleration measurements representing an estimated acceleration vector, wherein each acceleration vector includes an error component that offsets the estimated acceleration vector from a true acceleration vector due to bias errors, sensitivity errors, and cross-axis errors;
    a processor configured to execute modules; and
    a memory storing the modules, the modules comprising:
        a data collection module configured to determine that a threshold number of acceleration measurements are in a data set;
        a modeling module configured to maintain an accelerometer error correction model that includes bias error calibration parameters that specify weights for the bias error of the estimated acceleration vector components;
        an error module configured to determine calibration values for the bias error calibration parameters using the accelerometer error correction model and the plurality of acceleration measurements; and
        an application interface module configured to determine a calibration corrected estimate of a true acceleration vector that corresponds to a subsequently received acceleration measurement using the determined calibration values and the error correction model.

2. The device of claim 1, wherein the accelerometer error correction model further includes sensitivity calibration parameters that specify weights for the sensitivity error of the estimated acceleration vector components, and the error module is further configured to:
    determine calibration values for sensitivity calibration parameters that specify weight for the sensitivity error, and refine the determined calibration values for the bias error calibration parameters using the accelerometer error correction model and the plurality of acceleration measurements.

3. The device of claim 2, wherein the accelerometer error correction model further includes cross-axis error calibration parameters that specify weights for the cross-axis error of the estimated acceleration vector components, and the error module is further configured to:
    determine calibration values for the cross-axis error calibration parameters, the sensitivity calibration parameters, and the bias error calibration parameters, and refine the determined calibration values of the sensitivity calibration parameters and the bias error calibration parameters, using the accelerometer error correction model and the plurality of acceleration measurements.

4. The device of claim 1, wherein the error module is further configured to:
    set each of the calibration parameters in the error correction model to their respective default value.

5. The device of claim 4, wherein the accelerometer error correction model is represented by the equation:

$$\hat{a} = S(a-b)$$

where a is an acceleration vector that represents an acceleration measurement in the data set,
    b is a vector of the bias error calibration values,
    S is a matrix including sensitivity error calibration values on the matrix diagonals, and cross-term calibration values occupying the non-diagonal terms, and
    $\hat{a}$ is the true acceleration vector representing an estimated acceleration measurement that has been calibrated.

6. The device of claim 1, wherein the data collection module is further configured to:
    populate the data set with acceleration measurements that (1) have a threshold separation in angle with other acceleration measurements already in the data set, and (2) have a linear acceleration component that is below a maximum threshold linear acceleration for a threshold period of time.

7. The device of claim 1, wherein the error module is further configured to:
    determine, for each of the acceleration measurements in the data set, calibrated acceleration measurements using the accelerometer error model to form a set of acceleration vectors; and
    determine a calibration quality metric based in part on the set of acceleration vectors and a value for Earth's gravity.

8. The device of claim 7, wherein the application interface module is further configured to:

provide a calibration quality metric that is based in part on the calibration values and one or more of the calibration values to a third party application operating on the electronic device.

\* \* \* \* \*